US012782255B2

(12) United States Patent
Osuka et al.

(10) Patent No.: US 12,782,255 B2
(45) Date of Patent: Nov. 3, 2026

(54) HARDNESS PREDICTION METHOD OF HEAT HARDENED RAIL, THERMAL TREATMENT METHOD, HARDNESS PREDICTION DEVICE, THERMAL TREATMENT DEVICE, MANUFACTURING METHOD, MANUFACTURING FACILITIES, AND GENERATING METHOD OF HARDNESS PREDICTION MODEL

(71) Applicant: JFE Steel Corporation, Tokyo (JP)

(72) Inventors: Kenichi Osuka, Tokyo (JP); Hiroyuki Fukuda, Tokyo (JP); Satoshi Ueoka, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 983 days.

(21) Appl. No.: 18/009,523

(22) PCT Filed: Mar. 8, 2021

(86) PCT No.: PCT/JP2021/009060
§ 371 (c)(1),
(2) Date: Dec. 9, 2022

(87) PCT Pub. No.: WO2021/250957
PCT Pub. Date: Dec. 16, 2021

(65) Prior Publication Data
US 2023/0221231 A1 Jul. 13, 2023

(30) Foreign Application Priority Data
Jun. 10, 2020 (JP) ................................ 2020-100895

(51) Int. Cl.
*G01N 3/40* (2006.01)
*C21D 1/18* (2006.01)
(Continued)

(52) U.S. Cl.
CPC ................ *G01N 3/40* (2013.01); *C21D 1/18* (2013.01); *C21D 9/04* (2013.01); *C21D 11/005* (2013.01);
(Continued)

(58) Field of Classification Search
CPC ...... C21D 1/667; C21D 11/00; C21D 11/005; C21D 9/0062; C21D 1/18; B21C 51/00;
(Continued)

(56) References Cited

U.S. PATENT DOCUMENTS

2004/0028369 A1* 2/2004 Aylward ................. G02B 5/22 385/129
2013/0065079 A1 3/2013 Ueda et al.
(Continued)

FOREIGN PATENT DOCUMENTS

CN 1178250 A 4/1998
CN 101928811 A 12/2010
(Continued)

OTHER PUBLICATIONS

English translation of the International Preliminary Report on Patentability and Written Opinion dated Dec. 13, 2022, of counterpart International Application No. PCT/JP2021/009060.
(Continued)

*Primary Examiner* — Darrin D Dunn
(74) *Attorney, Agent, or Firm* — DLA Piper LLP (US)

(57) ABSTRACT

The hardness of a rail after the rail having a temperature equal to or higher than an austenite region temperature is forcibly cooled in a cooling facility is predicted. A plurality of sets of data for learning composed of a cooling condition data set and output data of hardness are acquired using a model that performs computing by using a cooling condition data set having at least a surface temperature of the rail before the start of cooling and the operating conditions of the
(Continued)

cooling facility as input data and the hardness inside the rail after the forced cooling as output data.

20 Claims, 10 Drawing Sheets

(51) Int. Cl.

| | |
|---|---|
| ***C21D 9/04*** | (2006.01) |
| ***C21D 11/00*** | (2006.01) |
| ***G01N 25/18*** | (2006.01) |

(52) U.S. Cl.
CPC ..... *G01N 25/18* (2013.01); *G01N 2203/0076* (2013.01); *G01N 2203/0212* (2013.01); *G01N 2203/0222* (2013.01)

(58) Field of Classification Search
CPC .... G01N 33/20; G05B 13/0265; B21B 37/74; G06F 30/27
See application file for complete search history.

(56) References Cited

U.S. PATENT DOCUMENTS

| | | | |
|---|---|---|---|
| 2015/0107727 | A1 | 4/2015 | Lainati et al. |
| 2016/0040263 | A1 | 2/2016 | Okushiro et al. |

FOREIGN PATENT DOCUMENTS

| | | | | | |
|---|---|---|---|---|---|
| CN | 103886371 | A | | 6/2014 | |
| DE | 102012020844 | A1 | | 4/2014 | |
| JP | S61-149436 | A | | 7/1986 | |
| JP | H09-227942 | A | | 9/1997 | |
| JP | 2005315703 | A | * | 11/2005 | ............ C21D 11/00 |
| JP | 4938158 | B2 | | 3/2012 | |
| JP | 2014038595 | A | * | 2/2014 | |
| JP | 5686231 | B1 | | 1/2015 | |
| JP | 2015523467 | A | * | 8/2015 | .......... C21D 11/005 |
| JP | 6261570 | B2 | | 12/2017 | |
| JP | 7148024 | B1 | * | 10/2022 | ............ G06N 20/00 |
| WO | WO-2022209320 | A1 | * | 10/2022 | ............ G06N 20/00 |

OTHER PUBLICATIONS

Ito et al., “Iron and Steel”, 64 (11), S806, 1978, with Abstract only in English.

Ito et al., “Iron and Steel”, 65 (8), A185-A188, 1979, with Abstract only in English.

A.R. Marder et al., “The effect of morphology on the strength of pearlite,” Metallurgical Transactions A, 7, 365-372, 1976 (Abstract).

Heat Transfer Engineering Material [Revised 5th Edition], Japan Society of Mechanical Engineers, 2009 (with English excerpt).

International Search Report dated May 11, 2021 in counterpart International Application No. PCT/JP2021/009060.

Written Opinion dated May 11, 2021 in counterpart International Application No. PCT/JP2021/009060.

Extended European Search Report dated Oct. 31, 2023, of counterpart European Patent Application No. 21820925.2.

S. Bruschi et al., “Real-Time Prediction of Geometrical Distortions of Hot-Rolled Steel Rings during Cooling,” Elsevier BV, vol. 54, No. 1, pp. 229-232, 2005.

Office Action dated Feb. 6, 2026, from counterpart Chinese Application No. 202180041784.0.

* cited by examiner

HARDNESS PREDICTION METHOD OF HEAT HARDENED RAIL, THERMAL TREATMENT METHOD, HARDNESS PREDICTION DEVICE, THERMAL TREATMENT DEVICE, MANUFACTURING METHOD, MANUFACTURING FACILITIES, AND GENERATING METHOD OF HARDNESS PREDICTION MODEL

TECHNICAL FIELD

This disclosure relates to manufacture of a heat hardened rail that includes a thermal treatment process of executing forced cooling on a rail having a high temperature equal to or higher than an austenite region temperature. It relates, in particular, to manufacture of a heat hardened rail for a transportation railway, which obtains a rail having at least a rail head portion having excellent hardness uniformity by forcibly cooling a rail heated to a temperature equal to or higher than the austenite region temperature.

BACKGROUND

In the manufacture of a heat hardened rail, for the purpose of improving quality such as hardness or toughness, forced cooling (thermal treatment process) may be executed on a rail manufactured by hot rolling. This forced cooling (thermal treatment process) is executed, for example, on a rail immediately after the end of rolling at a temperature equal to or higher than the austenite region temperature, or on a rail reheated to a temperature equal to or higher than the austenite region temperature after rolling and cooling. That is, the forced cooling is executed on the rail having a temperature equal to or higher than the austenite region temperature. A rail that is manufactured via a thermal treatment process is also referred to as "a heat hardened rail."

In particular, in a transportation railway that is used at a natural resource mining site, a loading capacity of a freight car is larger than that in a general passenger railway. For this reason, in the transportation railway, the rails are heavily worn so that the rails need to be replaced frequently. However, rail replacement not only increases work costs or replacement product cost, but also reduces a line utilization rate. Therefore, there is a demand to reduce the frequency of rail replacement. That is, in the transportation railway, it is required to use rails with high wear resistance.

To obtain a rail with high wear resistance, it is required that a hardness distribution in a region inside the cross section from a rail surface to a predetermined depth ("inside") is higher than a predetermined hardness value. Further, it is desirable that a crystal structure of the region is a pearlite structure. The reason is that a bainitic structure has low wear resistance even if it has the same hardness as the pearlite structure, and a martensite structure has low toughness.

To increase the hardness of the pearlite structure, it is effective to make the spacing between the ferrite and cementite layers (lamella) configuring the microstructure fine. Then, to obtain a fine lamella, it is necessary to cause transformation to proceed in a super-cooled state where a rail having a temperature equal to or higher than the austenite region temperature is cooled at a high cooling rate (cold rate) to a temperature sufficiently lower than an equilibrium transformation temperature. However, when the cold rate is excessive, there is a concern that transformation to the bainitic structure or the martensite structure may occur and the characteristics may deteriorate. Further, in general, the rail is cooled mainly on the surface of a rail head portion, which is the most important in terms of quality. At this time, the rail head portion is a portion where the mass is most concentrated, and therefore, in the rail head portion, a large temperature difference tends to occur between the surface and the inside during cooling. Therefore, in the rail head portion, a transformation start time also differs between the surface and the inside so that it is necessary to control the microstructure inside the rail by controlling the cooling capacity according to the time difference.

As a means of controlling the cooling of a heat hardened rail, for example, there is a technology described in JP 4938158 B. JP '158 discloses a method of performing a first forced cooling in which forced cooling is performed from a temperature range of 750° C. or higher to a temperature of 600 to 450° C. at a cooling rate of 4 to 15° C./sec, and then performing forced cooling again after pearlite transformation is ended by temporarily stopping the forced cooling.

Further, JP 5686231 B discloses a method of changing the conditions of forced cooling while determining a start timing or an end timing of transformation heat generation from the start of cooling, based on the temperature measurement result of a rail surface.

Further, JP S61-149436 A discloses a method of setting an injection distance between a cooling nozzle and a rail head portion, based on a carbon equivalent of a bloom used as a rail material, by using hardness at a representative point inside a rail set in advance and a relational expression between a carbon equivalent and an injection flow rate, an injection pressure, and an injection distance of a cooling medium, and setting a cooling time from the surface temperature (surface temperature before the start of cooling) of a head top portion of a rail measured on the inlet side of a cooling facility.

On the other hand, JP 6261570 B discloses a method of predicting a temperature history and a microstructure change inside a rail, and mechanical properties, and setting cooling conditions for each cooling zone, based on the prediction result, by using numerical, mechanical, and metallurgical embedded models as a process model in a control device.

The method described in JP '158 defines each condition of the start and end of the first forced cooling and the start and end of the second forced cooling, as the forced cooling conditions of the heated rail. However, when the cooling conditions are set in advance by the method described in JP '158, if variation in the component of the blooms of the rail material or variation in cooling start temperature or the like occurs, there is a problem in that variation occurs in the internal hardness of the rail after thermal treatment.

On the other hand, the method described in JP '231 is a method in which it is possible to consider the influence of fluctuation factors such as material variation or a cooling start temperature in that the cooling conditions are changed based on the temperature measurement result of the rail surface during the forced cooling. However, in the method described in JP '231, there is a problem in that the cooling conditions are changed only based on the surface temperature of the rail head portion and the cooling conditions are not changed to necessarily reflect a temperature change or a microstructure change inside the rail. For example, a temperature change due to heat conduction and a temperature change due to transformation occur at the same time inside the rail, and a temperature at each position or a position where transformation occurs changes with the passage of time. Therefore, it is difficult to estimate a microstructure distribution of the inside only from the measurement result of the surface temperature.

Further, in the method described in JP '436, since the hardness at a position 10 mm inside from the surface of the rail head portion is predicted by a simple formula using a physical model, it is possible to relate the hardness inside the rail to the cooling conditions. However, the microstructure formation inside the rail is complicatedly affected by the heat transfer behavior on the surface of the rail head portion by the cooling medium, the heat conduction behavior inside the rail, the microstructure change due to transformation, or the transformation heat generation. Therefore, it is difficult to accurately predict the hardness inside the rail by the simple formula. Further, since the hardness inside the rail differs according to the cross section, it cannot be said that it is sufficient from the viewpoint of securing the quality only by controlling the hardness at a specific position.

JP '570 describes that the final mechanical characteristics are predicted by performing heat transfer analysis including transformation prediction online by using a chemical composition of rail steel, rolling conditions, an austenite grain size before cooling, expected transformation behavior, a geometric shape of a rail cross section, a temperature distribution, and target mechanical properties as input, and the cooling conditions are reviewed as necessary.

However, since the cross-sectional shape of the rail is complicated, two-dimensional or three-dimensional heat conduction analysis or flow analysis of the cooling medium is required for heat transfer analysis or determination of the heat transfer coefficient, which is a boundary condition, using a physical model. Therefore, a calculation load is very large online. Furthermore, heat transfer analysis including transformation is a non-linear phenomenon. For this reason, a stable solution cannot be obtained unless a spatial resolution and time step for analysis are made very small. Therefore, in the capacity of the current computer, it is difficult to appropriately correct the cooling conditions by ending the calculation of heat transfer analysis during a period from the end of hot rolling to the loading into the cooling facility, determining appropriate cooling conditions, and performing recalculation according to the temperature history even in the cooling process.

As described above, there is a problem in that when controlling a hardness distribution inside the rail, it is realistically difficult to perform accurate control according to a fluctuation factor such as variation in the component of the bloom of the rail material or a cooling start temperature. In particular, the conditions of a material on the inlet side of the cooling facility vary for each bloom. For this reason, it is difficult to stably control the pearlite transformation, which progresses quickly and generates a large amount of heat, over the range from the surface to the inside by processing using online heat transfer analysis (numerical calculation by a physical model).

It could therefore be helpful to provide a means for enabling thermal treatment of a rail having a stable hardness distribution by controlling a microstructure from the rail surface to the inside into a desired microstructure.

SUMMARY

We thus provide a hardness prediction method for a heat hardened rail, of predicting, after a thermal treatment process in which a rail having a temperature equal to or higher than an austenite region temperature is forcibly cooled in a cooling facility, hardness of the rail, the method including: acquiring, by using an internal hardness computing model that is a physical model for performing computing by using a cooling condition data set having at least a surface temperature of the rail before a start of cooling and operating conditions of the cooling facility for the forced cooling as input data and using hardness inside at least a rail head portion of the rail after the forced cooling as output data, a plurality of sets of data for learning composed of the cooling condition data set and the hardness output data; generating in advance a hardness prediction model using the cooling condition data set as at least input data and using information on hardness inside the rail after the forced cooling as output data, by machine learning using the acquired plurality of sets of data for learning; and predicting the hardness of the rail after the thermal treatment process, based on information on the hardness inside the rail with respect to a set of cooling condition data sets set as cooling conditions of the thermal treatment process, obtained by using the hardness prediction model.

Further, we provide a thermal treatment method for a heat hardened rail having a thermal treatment process in which a rail having a temperature equal to or higher than an austenite region temperature is forcibly cooled in a cooling facility, the method including: measuring a surface temperature of the rail before a start of cooling; predicting hardness inside the rail by using the measured surface temperature of the rail by the hardness prediction method for a heat hardened rail according to an aspect of this disclosure, before the start of cooling of the rail in the cooling facility; and resetting, when the predicted hardness inside the rail is out of a target hardness range, operating conditions of the cooling facility such that the predicted hardness inside the rail falls within the target hardness range.

Still further, we provide a method of generating a hardness prediction model to obtain, after a rail having a temperature equal to or higher than an austenite region temperature is forcibly cooled in a cooling facility, hardness of the rail from a cooling condition data set having at least a surface temperature of the rail before a start of cooling in the cooling facility and operating conditions of the cooling facility for the forced cooling, the method including: acquiring, by using an internal hardness computing model that is a physical model for performing computing by using the cooling condition data set as input data and using hardness inside at least a rail head portion of the rail after the forced cooling as output data, a plurality of sets of data for learning composed of the cooling condition data set and the hardness output data; and generating in advance a hardness prediction model using the cooling condition data set as at least input data and using information on hardness inside the rail after the forced cooling as output data, by machine learning using the acquired plurality of sets of data for learning.

Yet further, we provide a method of manufacturing a heat hardened rail including: the thermal treatment method for a heat hardened rail.

Also further, we provide a hardness prediction device for a heat hardened rail, which predicts, after a thermal treatment process in which a rail having a temperature equal to or higher than an austenite region temperature is forcibly cooled in a cooling facility, hardness of the rail, the device including: a database configured to store a plurality of sets of data for learning computed using an internal hardness computing model that is a physical model for performing computing by using a cooling condition data set having at least a surface temperature of the rail before a start of cooling and operating conditions of the cooling facility for the forced cooling as input data and using hardness inside at least a rail head portion of the rail after the forced cooling as output data, and composed of the cooling condition data set and the hardness output data; a hardness prediction model generation unit configured to generate a hardness prediction model using the cooling condition data set as at least input data and using information on hardness inside the rail after the forced cooling as output data, by machine learning using the plurality of sets of data for learning; a thermometer configured to measure the surface temperature of the rail before the start of cooling; and a hardness prediction unit configured to predict the hardness of the rail after the thermal treatment process, based on information on the hardness inside the rail with respect to a set of cooling condition data sets set as cooling conditions of the thermal treatment process, by using a measured value measured by the thermometer and the hardness prediction model.

Still yet further, we provide a thermal treatment device for a heat hardened rail having a thermal treatment process in which a rail having a temperature equal to or higher than an austenite region temperature is forcibly cooled in a cooling facility, the device including: a hardness prediction unit configured to predict hardness inside the rail by the hardness prediction device for a heat hardened rail according to an aspect of this disclosure, before a start of cooling of the rail in the cooling facility; and an operating condition resetting unit configured to reset, when the hardness inside the rail predicted by the hardness prediction unit is out of a target hardness range, operating conditions of the cooling facility such that the predicted hardness inside the rail falls within the target hardness range.

We also provide a manufacturing facility for a heat hardened rail including: the thermal treatment device for a heat hardened rail.

As described above, the expression "inside the rail" refers to a region inside the cross section from the rail surface to a predetermined depth.

The processing of computing the data (data for learning) of the hardness distribution inside the rail after the forced cooling for a plurality of cooling conditions, which is processing with a large calculation load using heat transfer analysis or the like, can be executed offline, and therefore, it can be executed accurately. Then, the hardness prediction model to obtain data of the hardness distribution inside the rail after forced cooling with respect to the cooling conditions is obtained by machine learning, based on the accurate data for learning.

Therefore, for example, it becomes possible to appropriately control the microstructure of the region from the head portion surface to the inside of the heat hardened rail, and it becomes possible to manufacture the heat hardened rail with the suppressed quality variation by reducing variation in the hardness of each rail to be manufactured or variation in hardness in the longitudinal direction of the rail.

BRIEF DESCRIPTION OF THE DRAWINGS

FIGS. 4A to 4C are diagrams illustrating examples of a thermal treatment control method, in which FIG. 4A is a diagram describing cooling conditions in a one-stage cooling method, and FIGS. 4B and 4C are diagrams describing cooling conditions in a multi-stage step cooling method.

REFERENCE SIGNS LIST

Figure 1:
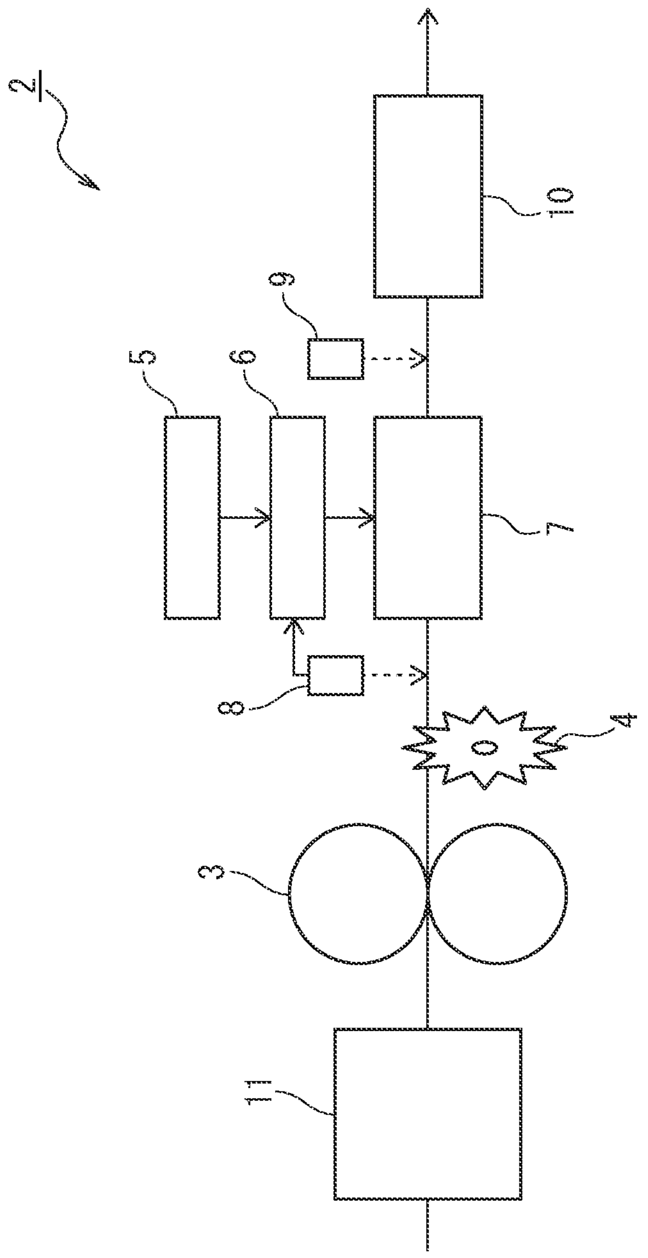
FIG. 1 is a schematic diagram illustrating a manufacturing facility for a heat hardened rail according to an example.

1 heat hardened rail
2 manufacturing facility
3 rolling machine
4 cutting machine
5 host computer
6 control device
7 cooling facility
8 thermometer
10 cooling bed
11 heating furnace
20 hardness prediction device
21 basic data acquisition unit
22 internal hardness offline calculation unit
22A heat transfer coefficient calculation unit
22B heat conduction calculation unit
22C microstructure calculation unit
22D hardness calculation unit
23 database
24 hardness prediction model generation unit
25 hardness prediction model
26 hardness prediction unit
61 operating condition initial setting unit
62 operating condition determination unit
63 operating condition resetting unit
64 cooling control unit
71 head top cooling header
72 head side cooling header
73 foot underside cooling header
74 head portion thermometer
75 foot portion thermometer

DETAILED DESCRIPTION

Next, an examples will be described with reference to the drawings.

Manufacturing Facility 2 for Heat Hardened Rail

FIG. 1 is a schematic diagram illustrating an example of a manufacturing facility 2 for a heat hardened rail, which manufactures a heat hardened rail 1. The manufacturing facility 2 illustrated in FIG. 1 includes a heating furnace 11, a rolling machine 3, a cutting machine 4, a cooling facility 7, and a cooling bed 10, and these facilities are disposed in this order along a transport direction (a pass line) for a rail material.

Heating Furnace 11

The heating furnace 11 executes treatment of heating a bloom produced by a continuous casting facility or the like to have a temperature equal to or higher than an austenite region temperature on the inlet side of the cooling facility 7, for example. However, this does not have reheating treatment as a pre-process of the cooling facility 7.

Rolling Machine 3

The rolling machine 3 is a hot rolling facility that shapes and elongates the bloom heated in the heating furnace 11 into a desired rail shape by a plurality of rolling passes. The rolling machine 3 is usually composed of a plurality of rolling stands.

Cutting Machine 4

The cutting machine 4 is a facility for dividing a long rail 1 stretched by the rolling machine 3 in a longitudinal direction, and is appropriately used according to the length of the rail as a product and the length of a rolled material. As the manufacturing facility 2, for example, there is also an instance where a rail having a rolling length of about 100 m is transported to the cooling facility 7 without being divided, or when a rail is transported after the length per piece is cut (sawn) into a length of, for example, about 25 m.

Cooling Facility 7

The cooling facility 7 is a facility that performs forced cooling (described later) on the rail 1 having a high temperature equal to or higher than the austenite region temperature. The cooling facility 7 is installed along the pass line for the rail 1 in a manufacturing line.

However, the cooling facility 7 does not need to necessarily have a configuration in which it is installed on the transport line from the rolling machine 3. For example, a configuration is also acceptable in which the cooling facility 7 is provided in an area different from the hot rolling facility and the hot-rolled rail 1 reheated to a temperature equal to or higher than the austenite region temperature in a heating furnace and then transported to the cooling facility 7. The cooling facility 7 is composed of a plurality of cooling zones disposed along the longitudinal direction of the rail 1 to be cooled, and the cooling zone to be used is set according to the length of the rail 1. The cooling conditions (operating conditions) of each cooling zone can be set individually.

Details of the cooling facility 7 will be described later.

Thermometer

A thermometer 8 is provided at a position on the inlet side of the cooling facility 7 (a position between the cutting machine 4 and the cooling facility 7), and detects the rail temperature before the start of cooling. The measurement result measured by the thermometer 8 is sent to a control device 6 that controls the cooling facility 7. The thermometer 8 measures, for example, at least the surface temperature of a head portion of the rail 1.

Further, a thermometer 9 that detects the temperature of the surface of the rail 1 after the end of forced cooling may be installed at a position on the downstream side of the cooling facility 7 (the outlet side of the cooling facility 7). In this example, the validity of the prediction result of the control device 6 can be determined by comparing the temperature after the end of forced cooling predicted in the control device 6 with the temperature measured by the thermometer 9.

Cooling Bed 10

The rail 1 forcibly cooled in the cooling facility 7 is transported to the cooling bed 10.

The cooling bed 10 has, for example, a role of correcting the rail 1 not to bend or a role of uniformly cooling the rail 1. Further, in the cooling bed 10, visual inspection, weight measurement, and the like of the manufactured rail 1 are appropriately executed.

Cooling Facility 7

The cooling facility 7 of this example is configured to forcibly cool the head portion and foot portion of the rail 1 carried to a treatment position by a cooling medium that is injected from a cooling header. The cooling header is provided for each cooling zone.

Figure 2:
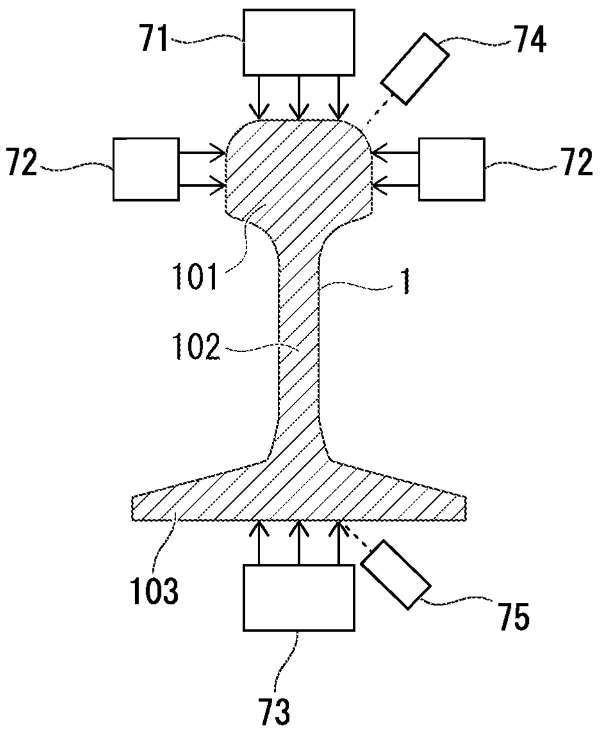
FIG. 2 is a diagram describing disposition of a header and the like for cooling in a cooling facility according to the example.

FIG. 2 is a diagram illustrating a disposition example of the cooling header included in the cooling facility 7 by a schematic diagram as viewed from a rail cross section. That is, as illustrated in FIG. 2, the cooling header of this example includes a head top cooling header 71 and a head side cooling header 72 for cooling a head portion 101 of the rail 1, and a foot underside cooling header 73 for cooling a foot portion 103 of the rail 1. If necessary, a web portion cooling header for cooling a web portion 102 of the rail 1 may be further provided. Further, the head top cooling header 71 and the head side cooling header 72 are collectively referred to as a "head portion cooling header."

Each of the head top cooling header 71, the head side cooling header 72, and the foot underside cooling header 73 (collectively "cooling headers 71, 72, and 73" as appropriate) is connected to a cooling medium source through a pipe, and the cooling medium is injected from a plurality of nozzles (not illustrated). Further, the pipe is provided with a control valve.

A cooling method which the cooling facility 7 of this example adopts is air impinging cooling. The air impinging cooling is a method of injecting compressed air as the cooling medium, which can achieve a cooling rate suitable for this disclosure and has little fluctuation in cooling capacity with respect to the surface temperature of a material to be cooled. However, the cooling method in the example is not limited to the air impinging cooling, and may be a water cooling method including mist cooling.

Figure 3:
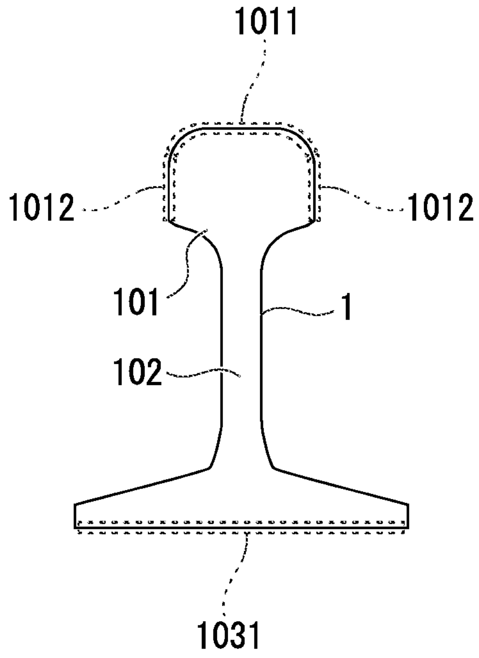
FIG. 3 is a diagram describing a forced cooling portion of a rail.

The specific nozzle disposition of each cooling header is as follows. That is, the nozzle of the cooling header 71 is disposed above the head portion 101 of the rail 1 along the longitudinal direction of the rail 1. The nozzle of the cooling header 71 injects the cooling medium (air) toward an upper surface (head top surface) 1011 of the head portion 101 illustrated in FIG. 3. Further, the nozzles of the cooling headers 72 are disposed along the longitudinal direction of the rail 1 on both sides of the head portion 101 of the rail 1 at the treatment position. The nozzle of the cooling header 72 injects the cooling medium (air) toward a side surface (head side surface) 1012 of the head portion 101 illustrated in FIG. 3. Further, the nozzle of the foot underside cooling header 73 is disposed along the longitudinal direction of the rail 1 below the foot portion 103 of the rail 1 at the treatment position. The nozzle of the foot underside cooling header 73 injects the cooling medium (air) toward an underside surface (foot underside surface) 1031 of the foot portion 103 illustrated in FIG. 3.

As the type of the nozzle, a group jet composed of a plurality of circular tube nozzles, a slit nozzle composed of slits having a rectangular gap or the like is suitable. In the air impinging cooling, it is generally known that the cooling capacity (heat transfer coefficient) can be controlled by adjusting an injection pressure and an injection distance (for example, Heat Transfer Engineering Material [Revised 5$^{th}$ Edition] Japan Society of Mechanical Engineers (2009)). Therefore, each of the cooling headers 71, 72, and 73 has a configuration in which pressure can be controlled to control the injection of the cooling medium (air). Further, for the purpose of matching a difference in the cross-sectional shape of the rail 1 according to the standard of the rail 1 and the purpose of controlling the cooling capacity, the cooling facility 7 is provided with a moving mechanism for each cooling header, whose distance from the surface of the rail 1 can be adjusted. As a position adjusting mechanism of each of these headers, there is an electric actuator, an air cylinder, a hydraulic cylinder or the like. As the position adjusting mechanism of this example, the electric actuator is suitable from the viewpoint of positioning accuracy. Further, a range finder (for example, a laser displacement meter) (not illustrated) for measuring the distance from the surface of the rail 1 to each cooling header is provided. Then, the injection distance of each cooling header during cooling can be controlled according to a setting value. In addition, to prevent the distance from the header from being changed due to the deformation of the rail 1 due to thermal contraction during cooling, there is provided a restraining device (not illustrated) that clamps the foot portion 103 or the like of the rail 1 and restrains the deformation in the up-down and right-left directions.

Further, as illustrated in FIG. 2, the cooling facility 7 includes a head portion thermometer 74 and a foot portion thermometer 75. The head portion thermometer 74 is provided above the head portion 101 of the rail 1 and measures the surface temperature of the head portion 101 (for example, one location in the head top surface 1011). The foot portion thermometer 75 is provided below the foot portion 103 of the rail 1 and measures the surface temperature of the foot portion 103 (for example, one location in the foot underside surface 1031). As each of these two types of thermometers 74 and 75, a plurality of thermometers are installed in the longitudinal direction within the cooling facility 7, and the temperature history of each place during cooling can be monitored by these two types of thermometers 74 and 75. Further, there is a situation where thermometers (not illustrated) that monitor the temperature of the air (cooling medium) that is injected are installed at a plurality of headers. This is because the injection temperature also affects the cooling capacity.

The injection pressure, the injection distance, the injection position, the injection time, and the like of the cooling medium that is injected toward the rail 1 in the cooling facility 7 are controlled by the control device 6 so that the cooling conditions can be adjusted.

Thermal Treatment Method

Next, the principle and others of the forced cooling treatment (thermal treatment) by the cooling facility 7 will be described.

We assume that the rail 1 before the forced cooling has been heated to a temperature equal to or higher than the austenite region temperature. Then, in the cooling facility 7, the forced cooling is executed on the high temperature rail 1, based on the cooling conditions. Due to this forced cooling, a temperature change or transformation in the surface and inside of the rail 1 proceeds, and a microstructure inside the rail 1 after the thermal treatment can be controlled by changing the cooling conditions by the head portion cooling header at any time.

Figure 4A:
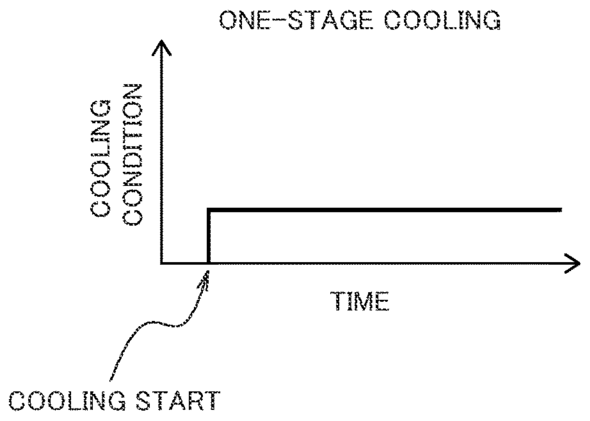
Figure 4B:
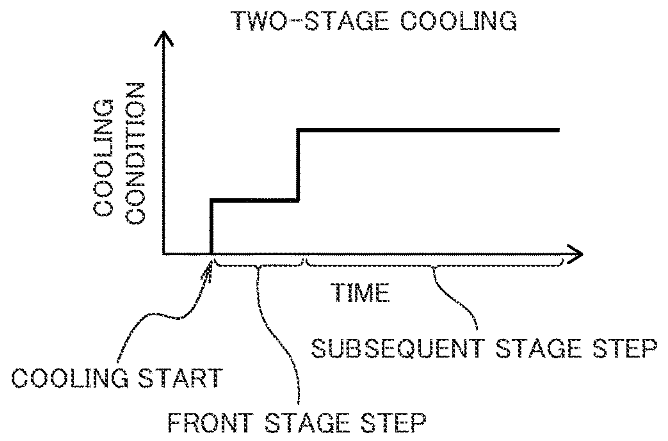
Figure 4C:
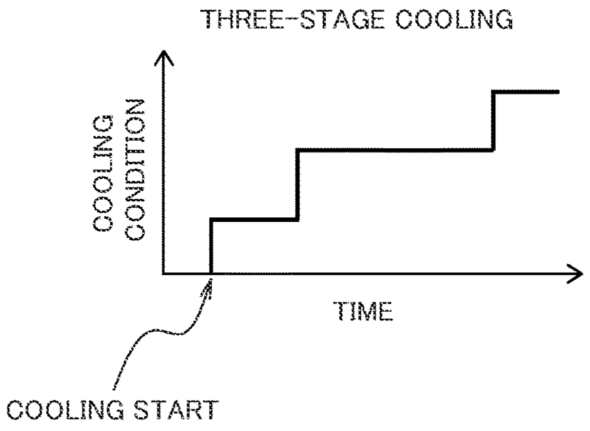

As a method of controlling the thermal treatment (forced cooling), there is a multi-stage step method such as a one-stage cooling method (FIG. 4A), a two-stage step method (FIG. 4B), a three-stage step method (FIG. 4C), as illustrated in FIGS. 4A to 4C. The one-stage cooling method is a method in which cooling is performed under a condition in which the injection flow rate, pressure, and injection distance of the cooling header as the cooling conditions are constant from the start of cooling to the end of cooling. The multi-stage step method is a method in which the cooling conditions are set to two stages (a front stage and a subsequent stage) or three or more stages from the start of cooling and the cooling conditions are changed stepwise with the passage of time. In this example, the multi-stage step method is adopted.

In the multi-stage step method, in each step, the injection flow rate, pressure, and injection distance of the cooling header are determined and a timing for transition to the next step is determined. However, the change of the cooling conditions does not always need to adopt the multi-stage step method in response to the passage of time, and the cooling conditions may be set as a function of time such that the cooling conditions to be changed can be specified with the passage of time.

The cooling conditions can be set individually for each cooling zone divided in the longitudinal direction. Further, in the head side cooling headers 72, the cooling conditions of the left and right cooling headers may be set to different conditions. Further, the injection flow rate, pressure, and injection distance of the cooling header may be changed in a stepped manner individually or in combination of two or more conditions. However, when the change is performed by the combination of two or more conditions, a plurality of conditions are changed at the same time according to the time step in FIGS. 4A to 4C.

In eutectoid steel widely used as the material of the rail 1, the transformation from austenite to pearlite occurs in a temperature range of about 550° C. to 730° C. In practice, to achieve both suppression of bainite and high hardness, it is desirable that the transformation occurs in the temperature range of 570 to 590° C.

In the transformation in such a target temperature range using the two-stage step method, the cooling in the front stage step is, for example, cooling from the start of cooling to before the surface starts transformation, and the cooling rate in the front stage step is preferably set to 4 to 6° C./sec. When the cooling rate is slower than this range, the transformation occurs at a high temperature and the hardness decreases. Further, when the cooling rate is faster than this range, there is a concern that bainite transformation may occur.

Figure 5:
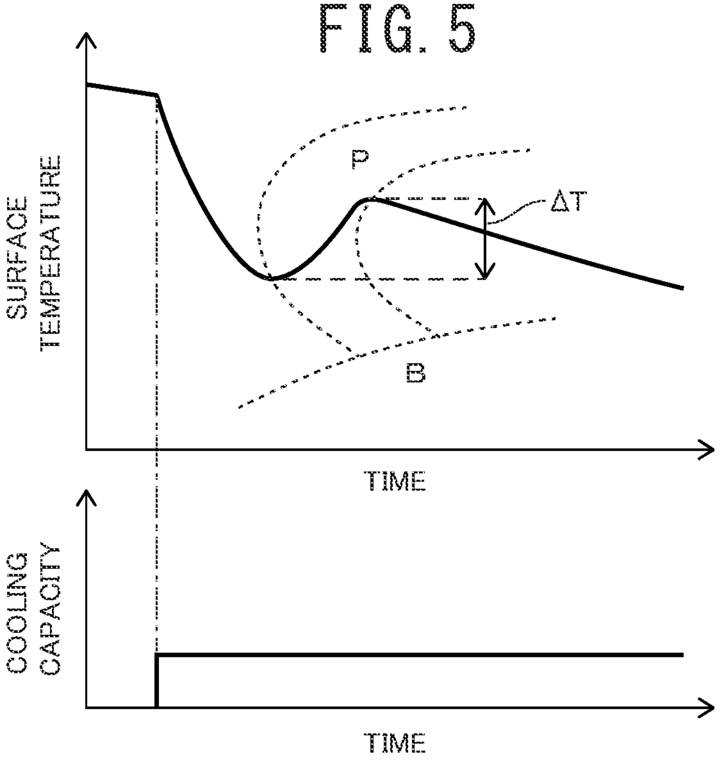
FIG. 5 is a diagram describing the relationship between a surface temperature and a transformation behavior by the one-stage cooling method.

FIG. 5 schematically illustrates an example of a microstructure change of the surface layer of the head portion of the rail 1. FIG. 5 illustrates an example in which the one-stage cooling method in which the cooling conditions are kept constant from the start to the end of the forced cooling is applied as the method of controlling thermal treatment. As illustrated in FIG. 5, when cooling is continued at a constant injection pressure, if pearlite transformation occurs, a rapid temperature rise $\Delta T$ (80 to 120° C.) occurs due to transformation heat generation. Since such a temperature rise softens the pearlite structure of the surface layer, it does not become possible to secure a predetermined hardness. Further, due to the influence of the transformation heat generation of the surface layer, the cooling rate decreases at a position about 5 to 10 mm inside from the surface, and a super cooling degree decreases so that the hardness inside the rail 1 after the thermal treatment also decreases. That is, when the thermal treatment control method is the one-stage cooling method, there is a concern that the hardness inside the rail 1 after the thermal treatment may not reach a target hardness.

Figure 6:
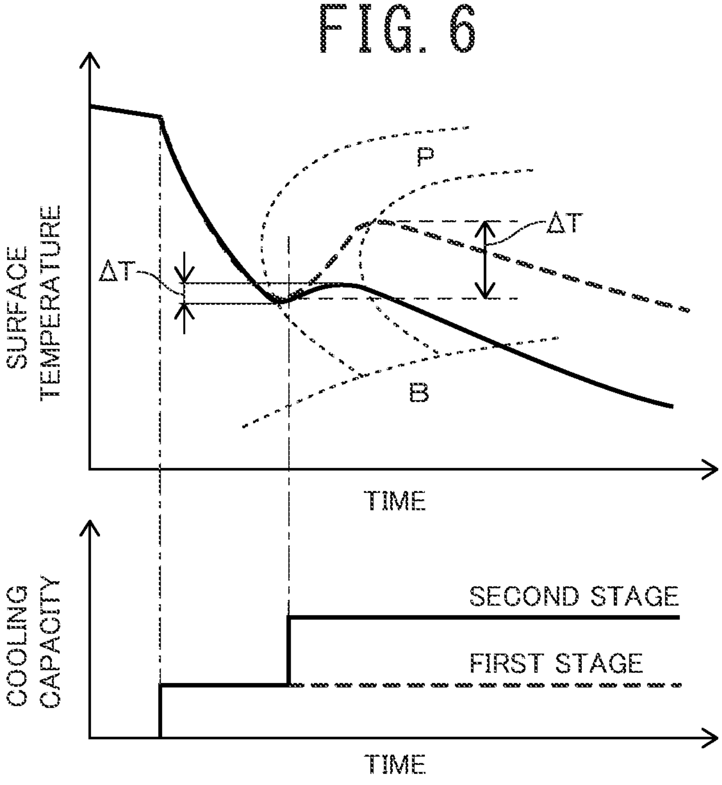
FIG. 6 is a diagram describing the relationship between a surface temperature and a transformation behavior by the two-stage step method according to the example.

In contrast, in the two-stage step method, as illustrated in FIG. 6, the cooling capacity can be increased in accordance with the transformation heat generation in the subsequent stage step after the transformation heat generation of the surface is started. By strengthening the cooling at a timing when the transformation starts on the surface in this manner, the temperature rise due to the transformation heat generation can be suppressed, and the pearlite structure of the surface is not easily softened. Further, it is possible to suppress a decrease in the cooling rate inside the rail 1 due to the influence of the transformation heat generation on the surface. However, if the cooling rate in the subsequent stage step is too high, the surface is strongly cooled while the pearlite transformation of the surface is not completed, and there is also a situation where some bainitic structures may be generated. Therefore, in the subsequent stage step, it is desirable that the average cooling rate from the start of transformation heat generation on the surface to the end of cooling is 1 to 2° C./sec.

When performing such two-step cooling (two-stage step method) by pressure control in the air impinging cooling, it is favorable if low-pressure air is injected in the slow cooling of the front stage step and high-pressure air is injected in the cooling of the subsequent stage step in which a temperature rise due to the transformation heat generation becomes remarkable. Pressure adjustment is generally performed using a flow rate regulation valve. Further, when performing the two-step cooling by changing the injection distance, in the slow cooling of the front stage step, air is injected from a long distance, and in the subsequent stage step cooling in which the influence of the transformation heat generation is large, air is injected from a close distance so that a similar effect can be obtained.

The transformation start time (a time when the cooling curve intersects a pearlite transformation start curve P) illustrated in FIG. 5 or 6 changes according to the cooling start temperature. Further, if the shape of the rail 1 changes, the mass of the head portion changes. Therefore, even if the same cooling conditions are set, the required cooling rate or cooling capacity changes. Therefore, it is necessary to control not only the timing of switching the cooling conditions from slow cooling to strong cooling by the control device 6 but also the cooling capacity by the injection pressure or the injection distance in each step. Further, since the transformation curve illustrated in FIGS. 5 and 6 changes according to the chemical composition of the rail steel or the austenite grain size before cooling, there is also a situation where the cooling conditions are changed according to the components contained in the bloom of the rail material or the pass schedule in the rolling machine 3, which affects the austenite grain size before cooling.

Hardness Prediction Method of Heat Hardened Rail 1 (Hardness Prediction Device 20)

This example has a hardness prediction device 20. The hardness prediction device 20 is a device for realizing a hardness prediction method for the heat hardened rail 1, which predicts the hardness of the rail 1 after the thermal treatment process in which the forced cooling is performed on the rail 1 having a temperature equal to or higher than the austenite region temperature in the cooling facility 7.

Figure 7:
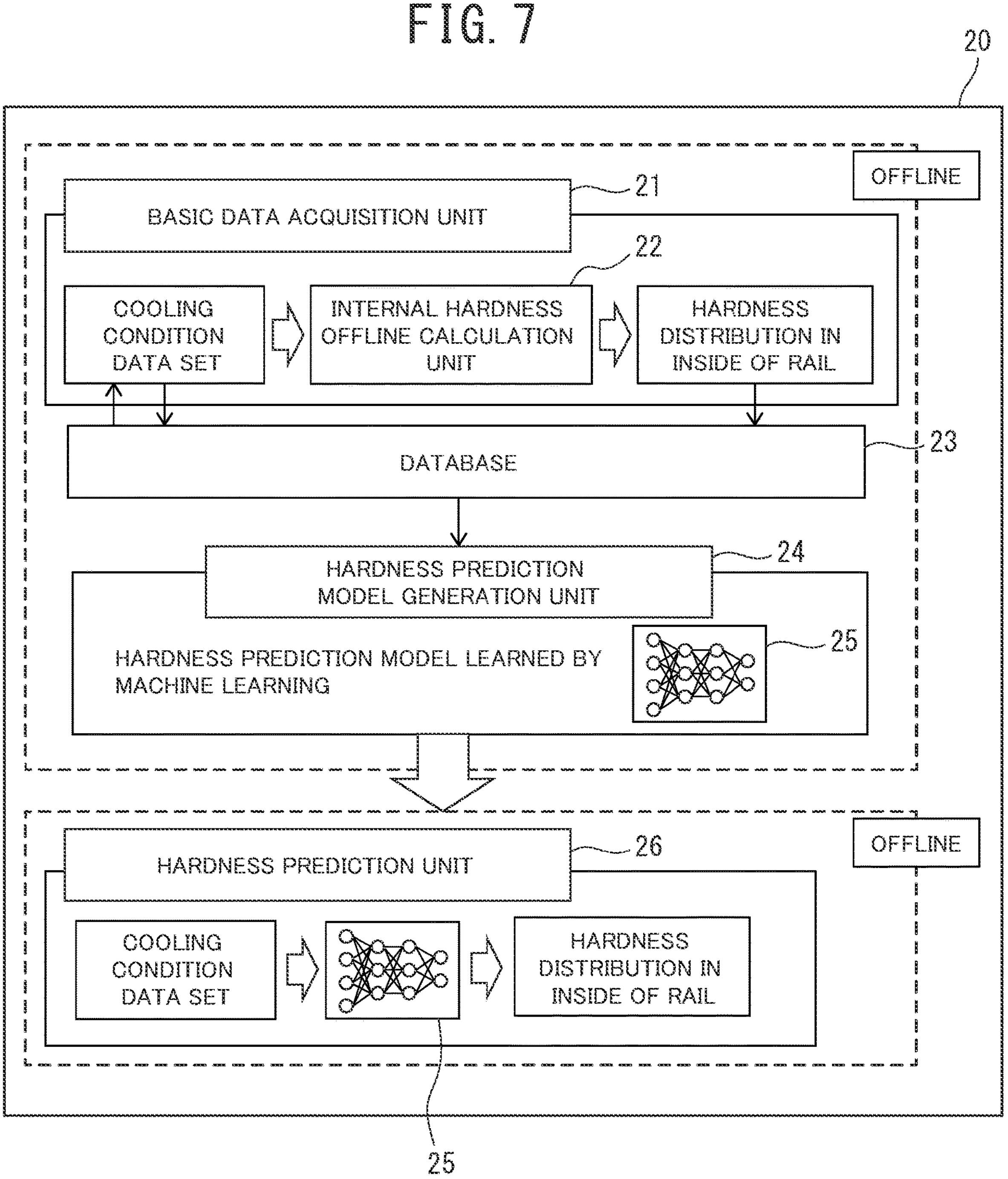
FIG. 7 is a diagram illustrating a configuration example of a hardness prediction device.

As illustrated in FIG. 7, the hardness prediction device 20 includes a basic data acquisition unit 21, a database 23 (a storage unit), a hardness prediction model generation unit 24, and a hardness prediction unit 26. The hardness prediction unit 26 is used online and is incorporated into the control device 6.

The set of data of cooling conditions having at least the surface temperature of the rail 1 before the start of cooling in the cooling facility 7 and the operating conditions of the cooling facility 7 is referred to as a cooling condition data set.

The cooling condition data set used offline includes numerical information corresponding to temperature information acquired by the thermometer 8 disposed on the inlet side of the cooling facility 7 as the surface temperature of the rail 1 before the start of cooling. Further, as the operating conditions of the cooling facility 7, the injection flow rate, the injection pressure, and the injection distance of each cooling header in each step from the start of cooling to the end of cooling and a switching timing of the cooling step (for example, a time from the start of cooling to the switching of each step) are included.

The cooling condition data set may include input information of the thermal treatment for cooling other than the surface temperature of the rail 1 before the start of cooling and the operating conditions of the cooling facility 7.

Basic Data Acquisition Unit 21

The basic data acquisition unit 21 has an internal hardness computing model which is a physical model for performing computing by using an offline cooling condition data set as input data and using the hardness inside at least the rail head portion of the rail 1 after the forced cooling as output data. In this example, execution of the numerical calculation using the internal hardness computing model is performed in the internal hardness offline calculation unit 22.

Then, the basic data acquisition unit 21 acquires a plurality of sets of data for learning composed of a cooling condition data set as input data and the hardness information inside the rail 1 as output data by executing offline computing by the internal hardness offline calculation unit 22 individually with respect to the plurality of cooling condition data sets. The basic data acquisition unit 21 stores the acquired data for learning in the database 23.

In this example, the data of the internal hardness, which is the output data computed by the internal hardness offline calculation unit 22, is expressed by an internal hardness distribution in at least a region from the surface of the rail 1 to a depth set in advance. The depth set in advance is, for example, 10 mm or more and 50 mm or less. The depth set in advance is set to, for example, a value equal to or larger than a limit value of a wear depth that can withstand practical use even if the surface layer of the head portion of the rail 1 is worn. Conventionally, it is preferably set to 1 inch (25.4 mm).

That is, the basic data acquisition unit 21 of the example has an internal hardness offline calculation unit 22 that is executed offline and executes numerical calculation using a set of cooling condition data sets composed of at least the surface temperature before the start of cooling and the operating conditions of the cooling facility 7 as input data and using the hardness distribution inside the rail 1 after the thermal treatment process as output data, and has a function of changing the cooling condition data set in various ways, calculating the hardness distribution inside the rail 1 for each cooling condition data set, and sending data for learning indicating the relationship between the obtained cooling condition data set and the hardness distribution to the database 23.

Configuration data such as a plurality of cooling condition data sets or data such as the surface temperature before the start of cooling configuring the cooling condition data set may be stored in the database 23 in advance. For each cooling condition data set, for example, a range of a temperature condition or the like is set based on past operating conditions, conditions of the rail 1 to be manufactured in the future or the like, and the cooling condition data set is determined from the values within the set range. However, the plurality of cooling condition data sets to be used do not need to be necessarily stored in advance in the database 23, and may be configured to be directly input to the internal hardness offline calculation unit 22.

Internal Hardness Offline Calculation Unit 22 (Internal Hardness Computing Model)

Figure 8:
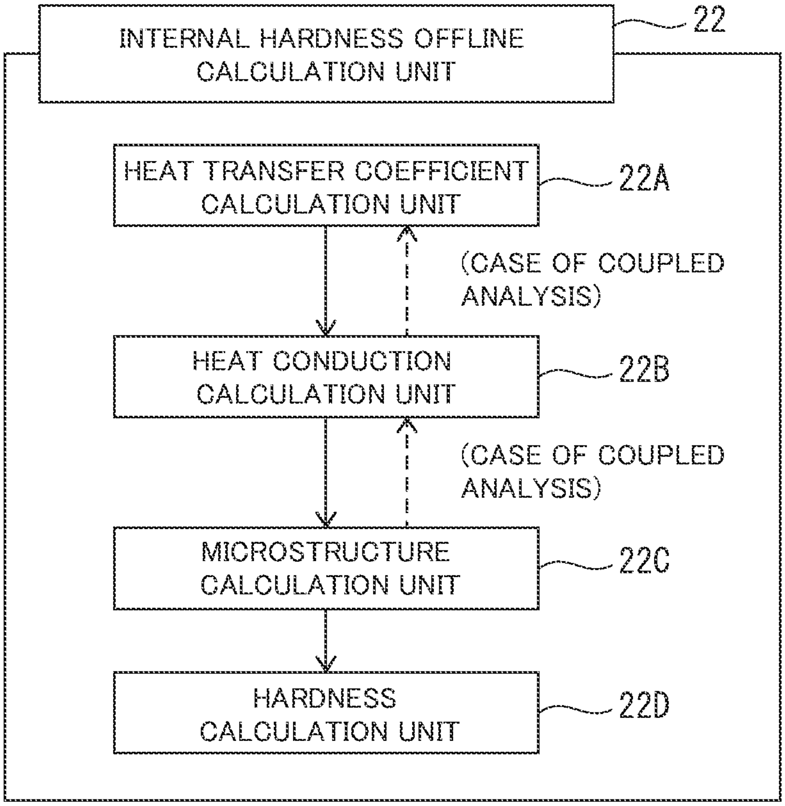
FIG. 8 is a diagram illustrating a configuration of an internal hardness offline calculation unit.

As illustrated in FIG. 8, the internal hardness offline calculation unit 22 includes a heat transfer coefficient calculation unit 22A, a heat conduction calculation unit 22B, a microstructure calculation unit 22C, and a hardness calculation unit 22D. In the hardness calculation based on the physical model by the internal hardness offline calculation unit 22, the calculation from the start of cooling to the end of cooling is performed in the order of heat transfer coefficient calculation, heat conduction calculation, and the processing of the microstructure calculation unit 22C, and can be obtained by calculating the hardness from the result of the final microstructure calculation.

However, when performing coupled analysis as described later, and when performing calculation from the start of cooling to the end of cooling, for example, at every time step in a range of 0.1 to 10 μs, a coupled calculation is performed between the heat transfer coefficient calculation, the heat conduction calculation, and the processing of the microstructure calculation unit 22C. After those calculations are ended, the calculations is executed with respect to the next time step. A method of repeating the above processing until the end of cooling is adopted. Since the hardness calculation is not incorporated into the coupled analysis, it is favorable if the calculation is performed based on the microstructure calculation result after the end of cooling.

The location of the rail 1 to be computed does not need to be necessarily executed on the entire surface of the rail 1. The internal hardness offline calculation unit 22 is used in computing at least the hardness of the head portion of the rail 1 where uniform hardness is most required.

Further, a known model formula may be adopted as the calculation formula of the internal hardness offline calculation unit 22 to obtain the hardness distribution from the cooling condition data set.

Heat Transfer Coefficient Calculation Unit 22A

The heat transfer coefficient calculation unit 22A calculates the heat transfer coefficient on the surface of the rail 1 during the thermal treatment. The heat transfer coefficient calculation unit 22A computes the heat transfer coefficients at a plurality of locations on the surface of the head portion of the rail 1.

The heat transfer coefficient calculation unit 22A of this example calculates the heat transfer coefficient of the surface of the rail 1 by a numerical fluid dynamics method such as a finite volume method by inputting the operating parameters of the cooling facility 7 and the rail shape. The finite volume method is a method in which a region to be analyzed is divided into a finite number of control volumes and an integraltype physical quantity conservation equation is applied to each volume. However, the heat transfer coefficient may be calculated by an experimental formula relating to forced convection, in which the relationship between dimensionless quantities such as the Nusselt number or the Reynolds number is obtained from a cooling experiment.

At this time, in the heat transfer coefficient calculation unit 22A, a time-series heat transfer coefficient (distribution of heat transfer coefficient that changes with time) at each position of the surface of the head portion of the rail 1 is obtained according to the injection flow rate, the injection pressure, and the injection distance, and the switching timing of the cooling step of each cooling header in each step from the start of cooling to the end of cooling. Further, the temperature of the injected cooling medium may be included in the variable.

Heat Conduction Calculation Unit 22B

The heat conduction calculation unit 22B calculates heat conduction inside the rail 1 by thermal treatment, for example, heat conduction in a two-dimensional cross section of the rail 1, by using the heat transfer coefficient calculated by the heat transfer coefficient calculation unit 22A as a boundary condition. As the heat conduction calculation, for example, the temperature distribution in the cross section is obtained.

The heat conduction calculation unit 22B of this example calculates a temperature history (heat conduction calculation) inside the rail 1 from the start of cooling to the end of cooling by using the heat transfer coefficient at each position on the surface of the head portion of the rail 1 output by the heat transfer coefficient calculation unit 22A as a boundary condition and using a numerical heat transfer analysis method such as a finite element method. Further, values such as thermal conductivity, specific heat, and density as physical property values required for heat conduction calculation are appropriately changed according to the component composition of the target rail 1.

In the two calculation units 22A and 22B described above, sufficient calculation accuracy can be obtained even in a method of performing the calculation of the heat conduction calculation unit 22B for calculating a temperature field by using the calculation result by the heat transfer coefficient calculation unit 22A for calculating a flow field. However, when it is desired to further improve the calculation accuracy, coupled analysis may be performed in consideration of the interaction between the flow field and the temperature field. Although the calculation accuracy is improved in the coupled analysis, it is practically difficult to apply it in an online analysis because the calculation load increases. However, the load increase is allowed because these analyses are executed offline.

Microstructure Calculation Unit 22C

The microstructure calculation unit 22C performs microstructure prediction in the cross section of the rail 1 considering phase transformation, from the temperature distribution inside the rail 1 based on the temperature history calculation calculated by the heat conduction calculation unit 22B. The microstructure prediction in the cross section is, for example, a microstructure distribution in the cross section.

The microstructure calculation unit 22C of this example performs microstructure prediction at each position in the cross section of the rail 1 in consideration of the phase transformation, from the temperature history inside the rail 1 obtained by the heat conduction calculation unit 22B. Since the behavior of the phase transformation changes according to the component composition of steel to be thermally treated or the austenite grain size before the start of cooling, the calculation is performed for each component composition corresponding to the standard of the target rail 1. Further, the austenite grain size changes according to the pass schedule in the rolling machine 3 or the time required from the end of rolling to the start of forced cooling. Therefore, the microstructure calculation may be performed for each of these operating conditions, and a microstructure prediction model for predicting the austenite grain size before the start of forced cooling may be further added. In the offline calculation, even when the component composition of steel that is a rail material or the austenite grain size is different, it is possible to perform the calculation with respect to a large number of conditions in advance. Therefore, these parameters may be added as input data of the hardness prediction model 25 (described later).

Further, in the microstructure calculation unit 22C of this example, a phase transformation calculation incorporating dynamic phase transformation characteristics such as a change in the phase transformation start temperature or a change in the progress rate of the phase transformation according to the cooling rate is performed.

Since not only the temperature history affects the phase transformation but also the temperature history is affected by the transformation heat generation, it is desirable that the microstructure calculation unit 22C and the heat conduction calculation unit 22B described above perform the coupled analysis. For the calculation of the transformation behavior in the microstructure calculation unit 22C, for example, a known calculation formula described in a method by Ito et al. (Iron and steel, 64 (11), S806, 1978, or Iron and steel, 65 (8), A185-A188, 1979) or the like can be used.

Hardness Calculation Unit 22D

The hardness calculation unit 22D calculates the hardness distribution in the cross section of the rail 1 from the microstructure distribution based on the microstructure prediction of each cross section calculated by the microstructure calculation unit 22C.

In the hardness calculation unit 22D of this example, the predicted hardness is calculated using a relational expression between each microstructure and the hardness with a chemical composition or the degree of super-cooling as input. For example, a pearlite structure is a lamella microstructure in which plate-like soft ferrite and hard cementite are layered, and it is known that there is a strong correlation between lamella spacing and hardness and, for example, a method by A. R. Marder et al. (The Effect of Morphology on the Strength of Pearlite: Met. Trans. A, 7A (1976), 365-372) can be used. Further, as the relational expression between the chemical composition, the degree of super-cooling, and the hardness of each microstructure, an experimental formula obtained in advance by an experiment or the like may be used.

Database 23

A data set in which the surface temperature of the rail 1 before the start of cooling, and the injection flow rate, the injection pressure, the injection distance, and the switching timing of the cooling step of each cooling header from the start of cooling to the end of cooling as the operating conditions of the cooling facility 7 are variously changed is generated as the cooling condition data set by using the internal hardness offline calculation unit 22. Further, the result of calculating the hardness distribution inside the rail 1 corresponding to each data set is stored in the database 23 as data for learning.

The hardness distribution inside the rail 1 which is the calculation result is expressed by hardness data corresponding to each position (the coordinates in the cross section) in the cross section of the head portion 101 of the rail 1. However, the hardness data of the hardness distribution is not a continuous value, but a discrete value according to the element division used in the calculation of the heat conduction calculation unit 22B or the microstructure calculation unit 22C.

Further, since there is little practical need for a fine hardness distribution in the cross section, it is sufficient if the hardness data extracted at a pitch in a range of about 1 to 5 mm as the coordinates in the cross section is used as the hardness distribution. As for the hardness data, the calculation results may be averaged for each pitch. Further, all the hardness information in the cross section is not necessary and, for example, data of the position and hardness in the vertical direction from the head top surface 1011 may be used as the hardness distribution inside the rail 1. Further, in addition to this data, as specified in JIS E 1120-2007, the position and hardness data at a position diagonally advanced from a head corner portion (the boundary portion between 1011 and 1012) may be used. At that time, as representative positions in an inward direction from the surface, several representative points such as depths of 2, 5, 10, 15, 20, and 25 mm are used, and the corresponding hardness data can be used as the hardness distribution inside the rail 1.

On the other hand, a diagram indicating the hardness distribution in the cross section of the rail 1 with contour lines or color-coded image data (data expressing the hardness distribution as an image) may be defined as the hardness distribution inside the rail 1. This is because, in machine learning means such as deep learning, generation of a hardness prediction model 25 using an image as output data is possible.

The cooling condition data set, which is the input data when constructing the database 23, may change the cooling condition within the range with reference to the past operating results. Further, within the range of the facility specifications of each cooling header of the cooling facility 7, the input conditions for the calculation are appropriately changed, and the calculation is performed by the internal hardness offline calculation unit 22.

As described above, the combination of a plurality of sets of input data (cooling condition data set) and output data (hardness calculation result) is created and stored in the database 23 in advance.

The data for learning to be stored may be a set of 500 or more input data (cooling condition data set) and output data (hardness calculation result). Preferably, 2000 or more data for learning are generated.

Hardness Prediction Model Generation Unit 24

In the hardness prediction model generation unit 24, the hardness prediction model 25 using the cooling condition data set as at least input data and using information on the hardness inside the rail 1 after forced cooling as output data is generated by the machine learning using a plurality of sets of data for learning stored in the database 23. Generation of the hardness prediction model 25 is executed offline.

A machine learning model to be used may be any model as long as the hardness can be predicted with the accuracy necessary for practical use. As the machine learning model, for example, a commonly used neural network (including deep learning), decision tree learning, random forest, support vector regression, or the like may be used. Further, an ensemble model in which a plurality of models are combined may be used.

Further, as the hardness prediction model 25, a machine learning model which determines whether or not the hardness value of the rail 1 is within the allowable range of the hardness distribution determined in advance, and uses data, in which the result is binarized as pass/fail, as output data may be used. At that time, it is preferable to use a classification model such as a k-nearest neighbor method or logistic regression.

Control Device 6

As illustrated in FIG. 1, the manufacturing facility 2 for the rail 1 of this example includes the control device 6 that controls the cooling conditions of the rail 1.

The control device 6 acquires the shape, chemical composition, target hardness (internal distribution), and reference cooling conditions of the rail 1 from a host computer 5, calculates the operating conditions for realizing them, issues a command to the cooling control device, and determines the operating parameters of the cooling facility 7.

Figure 9:
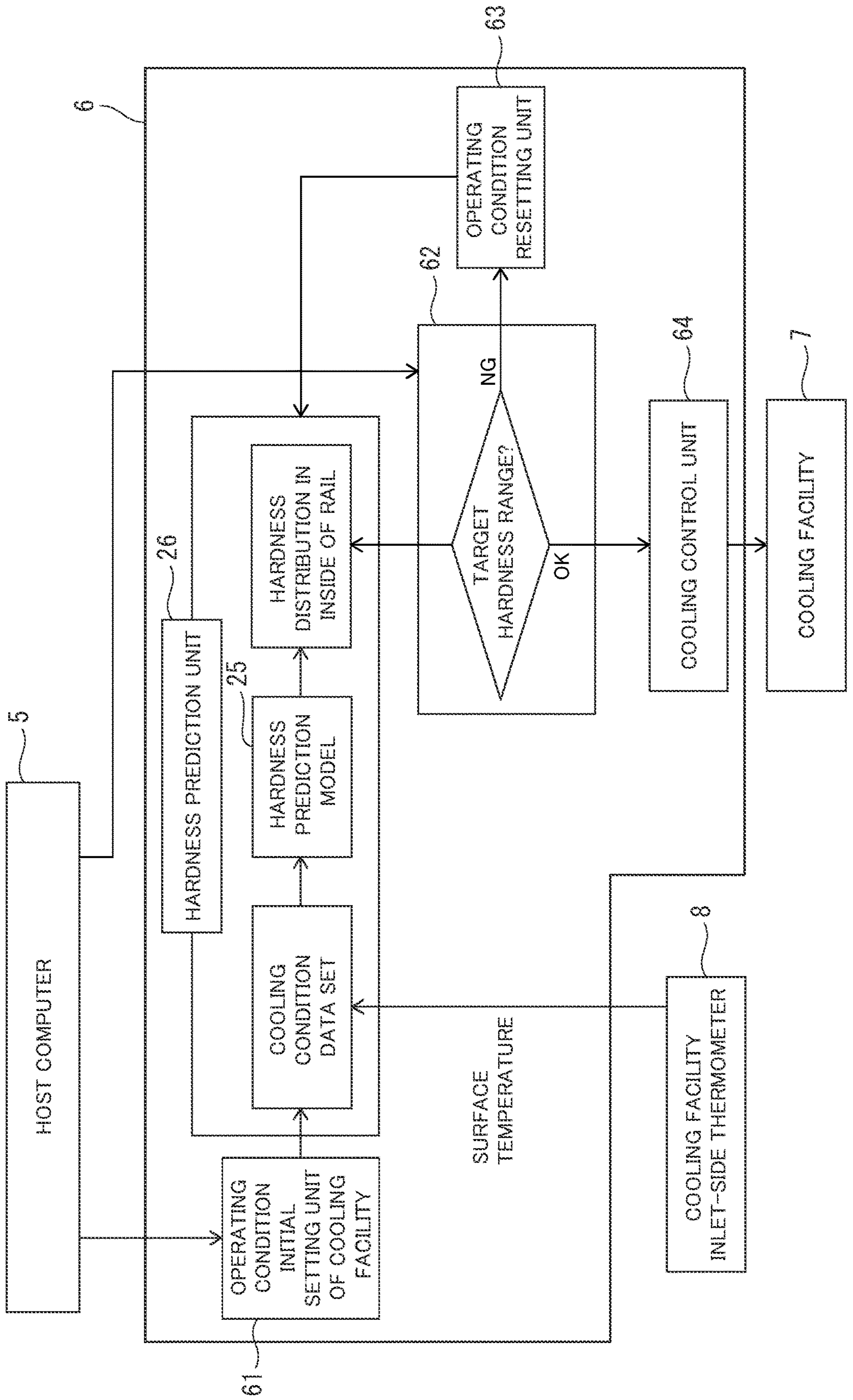
FIG. 9 is a diagram illustrating a configuration example of a control device that perform hardness control.

The configuration of the control device 6 in this example is illustrated in FIG. 9.

As illustrated in FIG. 9, the control device 6 includes an operating condition initial setting unit 61, the hardness prediction unit 26, an operating condition determination unit 62, and an operating condition resetting unit 63 of the cooling facility 7.

Operating Condition Initial Setting Unit 61

The operating condition initial setting unit 61 sets the injection pressure or the injection distance, and the injection position of the cooling header, and the switching timing of them in advance to not generate an abnormal microstructure such as the bainitic structure or the martensite structure while satisfying the target hardness distribution. These cooling conditions can be determined offline by an empirical rule based on the past operating results, methods described in JP '158, JP '231 and JP '436 or the like. Further, appropriate cooling conditions to obtain the target hardness are determined in advance with respect to the representative values of the rail type, standard, dimensions, and chemical composition of the rail 1 by using the basic data acquisition unit 21, and these conditions may be set in the operating condition initial setting unit 61 of the cooling facility 7.

Hardness Prediction Unit 26

The hardness prediction unit 26 predicts the hardness of the rail 1 after the thermal treatment process, based on the hardness inside the rail 1 with respect to a set of cooling condition data sets that are set as cooling conditions of the thermal treatment process, which is obtained by using the hardness prediction model 25.

The hardness prediction unit 26 of this example configures the cooling condition data set by using the surface temperature of the head portion of the rail 1 measured by the thermometer 8 on the inlet side of the cooling facility 7 and the cooling condition of the cooling header set by the operating condition initial setting unit 61. The hardness prediction unit 26 predicts the hardness distribution inside the rail 1 after the thermal treatment completion by using the hardness prediction model 25 generated offline by using the cooling condition data set generated online as input data.

Further, when the resetting of the operating conditions is executed by the operating condition resetting unit 63, the hardness prediction unit 26 updates the initial setting of the operating conditions, based on information after the resetting, and predicts the hardness distribution inside the rail 1 after the thermal treatment completion again.

Operating Condition Determination Unit 62

The operating condition determination unit 62 compares the hardness distribution inside the rail 1 obtained by the hardness prediction unit 26 with the target range of the hardness distribution inside the rail 1 received from the host computer 5.

Figure 10:
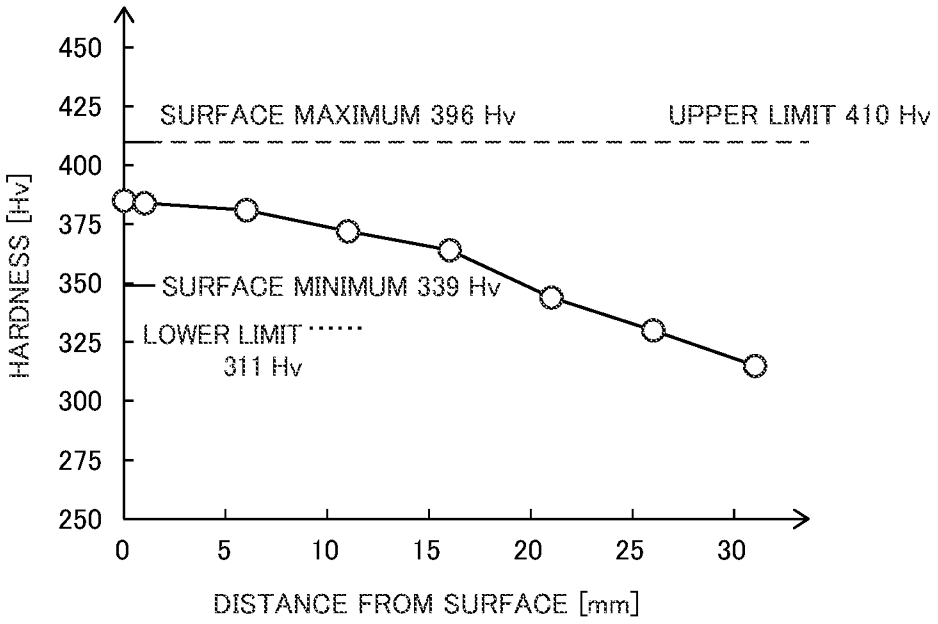
FIG. 10 is a diagram describing an example of a target hardness setting method according to an example.

The target hardness inside the rail 1 can be set to satisfy the hardness range defined in JIS E1120 (2007), as illustrated in FIG. 10, for example. In JIS E1120, the upper and lower limit values of the surface hardness of the head portion of the rail 1, the upper limit value of the internal hardness, and the lower limit value at a predetermined depth position (a reference point) are defined.

The position of the reference point is a position at the distance of 11 mm from the surface.

Figure 11A:
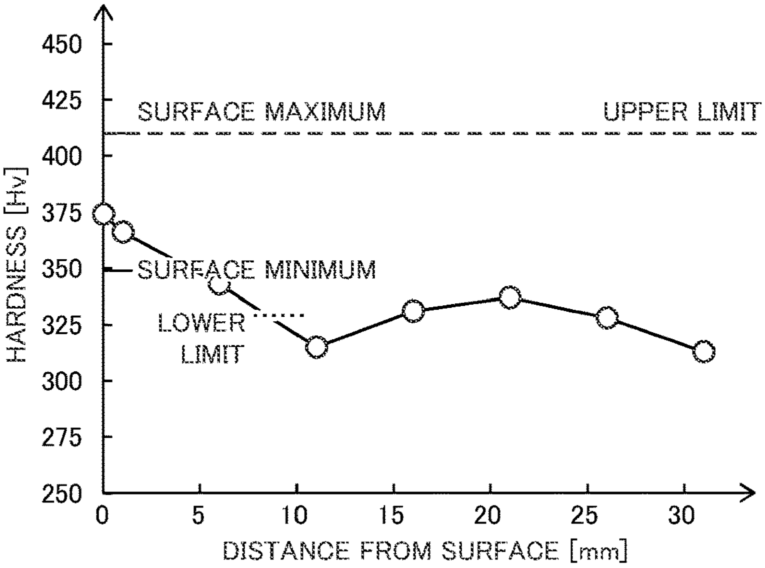
FIGS. 11A to 11C are diagrams illustrating examples when the hardness of the rail is out of a target range.
Figure 11B:
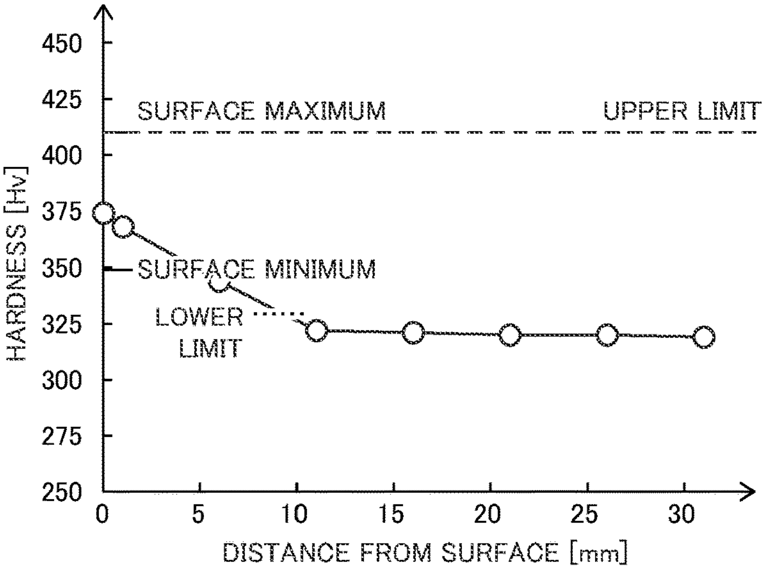
Figure 11C:
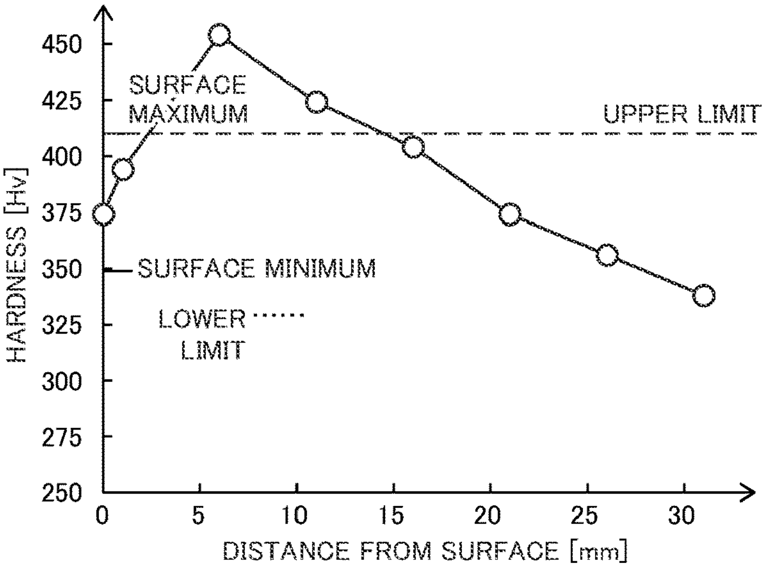

FIGS. 11A to 11C are diagrams illustrating examples when the hardness is out of the target hardness range.

Figure 12A:
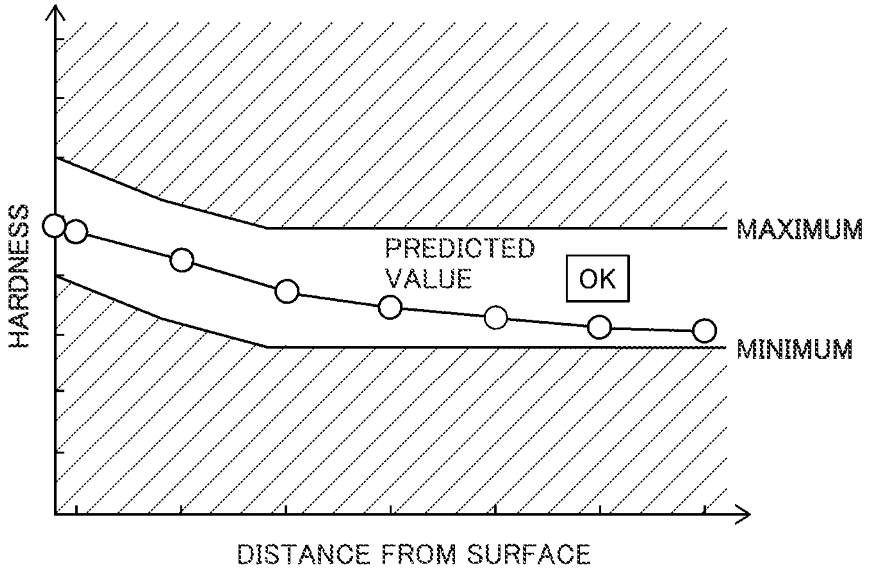
FIGS. 12A and 12B are diagrams describing other examples of the target hardness setting method according to an example.
Figure 12B:
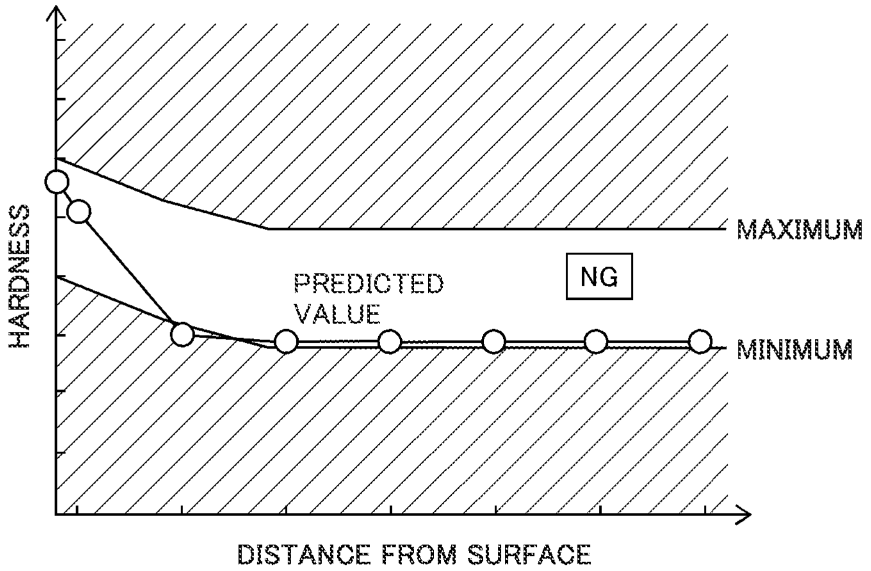

It is a general feature that the internal hardness of the head portion of the rail 1 decreases as the distance from the surface toward the inside increases. Therefore, as illustrated in FIGS. 12A and 12B, a target curve of the hardness distribution from the surface layer of the rail 1 to a certain depth may be set such that the difference from the hardness falls within a certain range. At that time, the standard of JIS E1120 shall be satisfied within the allowable range of the target curve of the hardness distribution.

Further, the target hardness corresponding to the hardness prediction position inside the rail 1 (the depth from the surface is set to be di. i represents an evaluation point (1 to n)) is set to be Bi, and whether or not expression (1) is satisfied may be determined by the allowable value a of the hardness error set in advance, by using hardness BPi at each position which is predicted:

$$\Sigma_{i=1}{}^{n}=i(B_i-BP_i)^2<\alpha \quad (1).$$

When the predicted internal hardness of the rail 1 does not fall within the target hardness range set in advance, a transition from the operating condition determination unit 62 to the operating condition resetting unit 63 is performed.

Operating Condition Resetting Unit 63

The operating condition resetting unit 63 resets the cooling condition.

In the resetting of the cooling condition, specifically, any of the injection flow rate, the injection pressure, the injection distance, and the switching timing of the cooling step of each cooling header in each step from the start of cooling to the end of cooling, or a plurality of operating parameters are reset. The reset operating parameters are used in the hardness prediction unit 26.

In this way, the correction of the operating parameters is executed such that the predicted hardness distribution inside the rail 1 falls within the target hardness range.

In the resetting of the cooling conditions, it is necessary to predict the hardness distribution from several times to several ten times. However, since the learned model is generated offline in advance and the hardness prediction is performed using the generated learned model, it is possible to execute output of the hardness prediction result with respect to one cooling condition data set in a short time. That is, even if the recalculation from several times to several ten times is performed, it is possible to perform the resetting in a short time as a whole.

Cooling Control Unit 6∝

A cooling control unit 64 executes the forced cooling treatment in the cooling facility 7 under the operating conditions in which it is determined that the hardness distribution inside the rail 1 obtained by the hardness prediction unit 26 is in the target range.

That is, the cooling control unit 64 performs control to execute the forced cooling at the switching timing of the injection flow rate, the injection pressure, the injection distance, and the cooling step of each cooling header which is predicted to have a hardness within the target range.

There is an example where it takes several seconds to open and close the valve of the cooling facility 7, and a delay of several seconds occurs even when the injection distance is changed. Therefore, a command to change the cooling conditions may be adjusted in consideration of a response time required for a change of the cooling conditions of each cooling header.

Further, the setting of the operating conditions of the cooling facility 7 can be carried out for each header divided in the longitudinal direction of the rail 1. In particular, since the speed at which the head and tail ends of the rail 1 pass through the rolling machine during rolling is not constant, the amount of cooling due to the contact with a roll, roll cooling water, and descaling water is increased, and the temperature easily decreases compared to that of a steady part in the center in the longitudinal direction. Therefore, the temperature distribution in the longitudinal direction of the rail 1 is measured by the thermometer 8 on the inlet side of the cooling facility 7, and the above method is applied to each position of the cooling header divided in the longitudinal direction to individually control the cooling conditions at each position in the longitudinal direction. In this way, even if the cooling start temperature is distributed in the longitudinal direction, it is possible to manufacture the rail 1 having uniform hardness in the longitudinal direction after the end of cooling.

Operation and Others

Execution of the internal hardness offline calculation unit 22, which performs computing in advance by a calculation formula based on a physical model, is performed offline. In this way, in this example, it is possible to accurately execute processing of computing data (data for learning) of the hardness distribution inside the rail 1 after the forced cooling with respect to a plurality of cooling conditions, which is processing with a large calculation load using heat transfer analysis or the like.

Further, in this example, the hardness prediction model 25 to obtain data of the hardness distribution inside the rail 1 after the forced cooling with respect to the cooling conditions, based on a large number of highly accurate data for learning, is obtained by the machine learning.

Then, by executing the hardness prediction by the hardness prediction model 25 online, it becomes possible to output the hardness prediction result by the internal hardness offline calculation unit 22 that performs a complicated calculation at an extremely high speed.

The data for learning in the database 23 can be created separately from the online operation of the cooling facility 7. Therefore, it is possible to accumulate the data set in the database 23 at any time, and update the hardness prediction model 25 periodically (for example, once a month). In this way, the number of data sets that are the basis of the hardness prediction model 25 increases, and the accuracy of the output result of the learned model is improved. In particular, unlike the data that is accumulated in actual operation, the values of the cooling condition data set can be set intentionally, and therefore, statistical bias does not easily occur in the cooling condition data set, and the data becomes suitable for the machine learning. Therefore, there is a feature that the accuracy improves as the number of data sets increases.

In this example, since high-precision hardness prediction can be executed online in a short time as described above, the forced cooling (thermal treatment) is executed under the operating conditions with the hardness inside the rail 1 as the target hardness range. As a result, for example, it becomes possible to appropriately execute the microstructure control from the head portion surface to the inside of the heat hardened rail 1. As a result, it becomes possible to manufacture the heat hardened rail 1 in which variation in hardness of each rail 1 to be manufactured or variation in hardness in the longitudinal direction of the rail 1 is reduced and quality variation is suppressed.

Effects (1) This example is the hardness prediction method for a heat hardened rail 1, of predicting, after the thermal treatment process in which the rail 1 having a temperature equal to or higher than the austenite region temperature is forcibly cooled in the cooling facility 7, the hardness of the rail 1, the method including: acquiring, by using the internal hardness computing model that is a physical model to perform computing by using a cooling condition data set having at least a surface temperature of the rail 1 before the start of cooling and the operating conditions of the cooling facility 7 for forced cooling as input data and using the hardness inside at least the rail head portion of the rail 1 after the forced cooling as output data, a plurality of sets of data for learning composed of the cooling condition data set and the hardness output data; generating in advance the hardness prediction model 25 using the cooling condition data set as at least input data and using the hardness inside the rail 1 after the forced cooling as output data, by the machine learning using the acquired plurality of sets of data for learning; and predicting the hardness of the rail 1 after the thermal treatment process, based on the hardness inside the rail 1 with respect to a set of cooling condition data sets that are set as the cooling conditions of the thermal treatment process, obtained by using the hardness prediction model 25.

For example, there is used the hardness prediction device 20 for the heat hardened rail 1, which predicts, after the thermal treatment process in which the rail 1 having a temperature equal to or higher than the austenite region temperature is forcibly cooled in the cooling facility 7, the hardness of the rail 1, the device including: the database 23 that stores a plurality of sets of data for learning computed using the internal hardness computing model that is a physical model to perform computing by using the cooling condition data set having at least the surface temperature of the rail 1 before the start of cooling and the operating conditions of the cooling facility 7 for forced cooling as input data and the hardness inside at least the rail head portion of the rail 1 after the forced cooling as output data, and composed of the cooling condition data set and the hardness output data; the hardness prediction model generation unit 24 that generates the hardness prediction model 25 using the cooling condition data set as at least input data and the hardness inside the rail 1 after the forced cooling as output data, by the machine learning using the plurality of sets of data for learning; and the hardness prediction unit 26 that predicts the hardness of the rail 1 after the thermal treatment process, based on the hardness inside the rail 1 with respect to a set of cooling condition data sets that are set as the cooling conditions of the thermal treatment process, by using the hardness prediction model 25.

According to this configuration, since high-precision hardness prediction can be executed online in a short time, forced cooling (thermal treatment) is executed under the operating conditions with the hardness inside the rail 1 as the target hardness range. As a result, for example, it becomes possible to appropriately control the microstructure from the surface of the head portion to the inside of the heat hardened rail 1, and it becomes possible to manufacture the heat hardened rail 1 in which variation in hardness of each rail 1 to be manufactured or variation in hardness in the longitudinal direction of the rail 1 is reduced and quality variation is suppressed.

(2) In this example, output data computed using the internal hardness computing model is a hardness distribution in at least a region from the surface of the rail 1 to a depth set in advance.

According to this configuration, it becomes possible to more reliably predict the hardness for thermal treatment.

(3) In this example, the internal hardness computing model includes the heat transfer coefficient calculation unit 22A that calculates the heat transfer coefficient of the surface of the rail 1 during the thermal treatment using the cooling facility 7, the heat conduction calculation unit 22B that calculates a temperature history inside the rail 1 by the thermal treatment by using the heat transfer coefficient calculated by the heat transfer coefficient calculation unit 22A as a boundary condition, the microstructure calculation unit 22C that predicts the microstructure inside the rail 1 considering phase transformation, from the temperature distribution inside the rail 1 based on the temperature history calculation calculated by the heat conduction calculation unit 22B, and the hardness calculation unit 22D that calculates the hardness inside the rail 1 from the microstructure distribution inside the rail 1 based on the microstructure prediction inside the rail 1 calculated by the microstructure calculation unit 22C.

According to this configuration, it becomes possible to more reliably predict the hardness for thermal treatment.

(4) This example is the thermal treatment method for the heat hardened rail 1 having a thermal treatment process in which the rail 1 having a temperature equal to or higher than the austenite region temperature is forcibly cooled in the cooling facility 7, the method including: predicting the hardness inside the rail 1 by the hardness prediction method for the heat hardened rail 1 of this example, before the start of cooling of the rail 1 in the cooling facility 7; and resetting, when the predicted hardness inside the rail 1 is out of a target hardness range, the operating conditions of the cooling facility 7 such that the predicted hardness inside the rail 1 falls within the target hardness range.

For example, there is used the thermal treatment device for the heat hardened rail 1 having a thermal treatment process in which the rail 1 having a temperature equal to or higher than the austenite region temperature is forcibly cooled in the cooling facility 7, the device including: the hardness prediction unit 26 that predicts the hardness inside the rail 1 by the hardness prediction device 20 for the heat hardened rail 1 according to this example, before the start of cooling of the rail 1 in the cooling facility 7; and the operating condition resetting unit 63 that resets, when the hardness inside the rail 1 predicted by the hardness prediction unit 26 is out of a target hardness range, the operating conditions of the cooling facility 7 such that the predicted hardness inside the rail 1 falls within the target hardness range.

According to this configuration, the forced cooling (thermal treatment) can be executed under the operating conditions in which the hardness inside the rail 1 is within the target hardness range. As a result, for example, it becomes possible to appropriately control the microstructure from the surface of the head portion to the inside of the heat hardened rail 1, and it becomes possible to manufacture the heat hardened rail 1 in which variation in hardness of each rail 1 to be manufactured or variation in hardness in the longitudinal direction of the rail 1 is reduced and quality variation is suppressed.

(5) In this example, the operating conditions of the cooling facility 7 to be reset include at least one operating condition among the injection pressure, the injection distance, the injection position, and the injection time of a cooling medium that is injected toward the rail 1 in the cooling facility 7.

According to this configuration, it becomes possible to more reliably set the operating conditions in which the hardness inside the rail 1 is the target hardness range.

(6) In this example, the cooling facility 7 has a plurality of cooling zones disposed along the longitudinal direction of the rail 1 to be cooled, and the resetting of the operating conditions of the cooling facility 7 is executed individually for each of the cooling zones.

According to this configuration, it becomes possible to more finely set the operating conditions in which the hardness inside the rail 1 is the target hardness range.

(7) This example is a method of generating the hardness prediction model 25 for obtaining, after the rail 1 having a temperature equal to or higher than the austenite region temperature is forcibly cooled in the cooling facility 7, the hardness of the rail 1 from the cooling condition data set having at least the surface temperature of the rail 1 before the start of cooling in the cooling facility 7 and the operating conditions of the cooling facility 7 for the forced cooling, the method including: acquiring, by using the internal hardness computing model that is a physical model to perform computing by using the cooling condition data set as input data and using the hardness inside at least the rail head portion of the rail 1 after the forced cooling as output data, a plurality of sets of data for learning composed of the cooling condition data set and the hardness output data; and generating in advance the hardness prediction model 25 using the cooling condition data set as at least input data and using the hardness inside the rail 1 after the forced cooling as output data, by the machine learning using the acquired plurality of sets of data for learning.

According to this configuration, it becomes possible to generate the hardness prediction model 25 capable of executing high-precision hardness prediction online in a short time.

The hardness prediction model 25 may be, for example, a neural network model (including a deep learning model), a random forest, or a model learned by SVM regression.

(8) In this example, the output data that is computed using the internal hardness computing model is a hardness distribution in at least a region from the surface of the rail 1 to a depth set in advance, and the output data of the hardness prediction model 25 is also data of the hardness distribution in at least a region from the surface of the rail 1 to a depth set in advance.

According to this configuration, it becomes possible to obtain, with high accuracy, information for manufacturing a rail in which at least the surface layer of the rail head portion has excellent hardness uniformity.

(9) In this example, there is provided the method of manufacturing the heat hardened rail 1 including the thermal treatment method for the heat hardened rail 1 of the example. For example, there is provided the manufacturing facility for the heat hardened rail 1 having the thermal treatment device for the heat hardened rail 1 of the example.

According to this configuration, it becomes possible to manufacture a rail in which at least the surface layer of the rail head portion has excellent hardness uniformity.

Example

Next, examples will be described.

The heat hardened rail 1 was manufactured by using the manufacturing facility 2 for the rail 1 (refer to FIG. 1).

In this example, the rails 1 of a plurality of rail types and standards were forcibly cooled, and after air cooling to room temperature, the microstructure of the head portion and the hardness distribution in the cross section were evaluated. In each Example and each Comparative Example, 20 pieces of heat hardened rails 1 were manufactured, and variation in each rail was evaluated.

The target rails 1 were set to be a total of four types, two types of rails (JIS 60 kg rail and 50 kg N rail) and two types of standards (high hardness rail H and normal hardness rail L). Then, after hot rolling was completed at about 900° C., forced cooling was performed by the cooling facility 7 installed online while keeping a rolling length (without cutting). The austenite temperature of the steel grade used in the present example was 760° C., and the equilibrium transformation temperature was 720° C.

A target value of the inlet-side temperature by the inlet-side thermometer 8 of the cooling facility 7 was set to 750° C., and the cooling condition set in advance by offline calculation was set as an indicated value of the operating condition initial setting unit 61 such that target hardness distributions were obtained with respect to the four types of rails 1.

As the cooling condition, cooling was performed by a two-step method, and the setting values of the injection pressure in the front stage step and the subsequent stage step and a switching time from the front stage step to the subsequent stage step were set according to the type of the rail 1 to be thermally treated (in the table, "fixed" indicates a standard condition).

In this example, the used hardness prediction model 25 corresponded to the four types of rails 1 of Examples 1 to 4, and the hardness prediction model 25 corresponding to each rail was generated. In the database 23 used to generate the hardness prediction model 25, the relationship between the microstructure and the hardness was created by a regression formula by experiments using a one-stage cooling method in which the injection flow rate and pressure of the cooling nozzle are variously changed by using a laboratory scale cooling experimental device. The number of data used to generate the hardness prediction model 25 was 500.

At this time, in the actual operation, between the temperature value measured by the inlet-side thermometer 8 and the target temperature, variation in each of the 20 rails 1 and temperature variation according to a position in one rail were combined, resulting in variation in a range of −30 to +10° C.

In the Comparative Examples, even if there are these variations, a fixed pattern set by the operating condition initial setting unit 61 was used as the cooling condition. On the other hand, in this example, the actual measurement value by the inlet-side thermometer and the cooling condition set in advance by the operating condition initial setting unit 61 were used as the cooling condition data set, the hardness distribution inside the rail 1 was predicted, and it was determined whether or not it was within the target hardness range. With respect to the target hardness, as the target hardness illustrated in FIG. 10, the "lower limit" and the "upper limit" of the hardness of the surface were defined in Table 1 and defined by the "lower limit" at the "reference point" and the "upper limit" of the "whole" of the inside.

In this example, when the hardness distribution inside the rail 1 predicted by the hardness prediction unit 26 fell within the target hardness range, the forced cooling was performed under the initially set cooling conditions, and when the hardness distribution deviated from the target range, the injection pressure in the front stage step, the injection pressure in the subsequent stage step (adjusted within the range of the "injection pressure adjustment amount" in the table), and the timing of transition from the front stage step to the subsequent stage step (the corrected range of "injection time adjustment amount" in the table) were changed. In this example, the injection distance was set to be constant (15 mm) during cooling regardless of the type of the rail in both the Examples and the Comparative Examples.

After the end of the cooling, the rail 1 was removed from the restraining device, transported to the cooling bed 10, and air-cooled to room temperature. Then, the rail 1 air-cooled to room temperature was cut, and the microstructure observation of the head portion and the hardness test were performed. For the hardness measurement and microstructure observation of the head portion, the rail 1 having a total length of 100 m was divided into five pieces, and samples were taken at each position (for each condition, 20 pieces of the rails 1×5 sample=100). The head portion microstructure was evaluated by observing the cut surface of the sample with an SEM (scanning electron microscope). Further, the hardness was evaluated by a Brinell hardness test at each depth position of 0 to 20 mm from the head top surface. With respect to the measurement results of the hardness, the maximum value and the minimum value in 100 pieces of data were evaluated.

The "maximum" and "minimum" of the "reference point" in Table 1 and the "maximum" and "minimum" in the surface correspond to this. When these values were within the range of the upper and lower limit values of the target hardness and within the range of the "upper limit" in the whole of the inside was defined as "○." Further, as a result of microstructure observation, an abnormal microstructure such as the bainitic structure or the martensite structure did not occur in all the examples, and those having the pearlite structure were evaluated as "○." The experimental conditions and the evaluation results are shown in Table 1.

TABLE 1

| | | | Injection pressure [kPa] | | Injection pressure adjustment amount [kPa] | | Injection | Deviation from inlet-side thermometer target | Front stage | Subsequent stage | Hardness [Hv] |
|---|---|---|---|---|---|---|---|---|---|---|---|
| | Rail type | Standard | Front stage | Subsequent stage | Front stage | Subsequent stage | time adjustment amount [s] | temperature [° C.] | cooling rate [° C./s] | cooling rate [° C./s] | Reference point Lower limit |
| Ex. 1 | JIS 60 kg | HH370 | 10 | 30 | ±3 | ±5 | ±5 | −30 to +10 | 6 | 2 | 331 |
| Ex. 2 | JIS 60 kg | HH340 | 7 | 25 | ±3 | ±5 | ±5 | −30 to +10 | 4 | 1 | 311 |

TABLE 1-continued

| | | | | | | | | | | | |
|---|---|---|---|---|---|---|---|---|---|---|---|
| Ex. 3 | JIS 50 kg N | HH370 | 5 | 20 | ±2 | ±5 | ±3 | −30 to +10 | 6 | 2 | 331 |
| Ex. 4 | JIS 50 kg N | HH340 | 3 | 15 | ±1 | ±3 | ±3 | −30 to +10 | 4 | 1 | 311 |
| Comp. Ex. 1 | JIS 60 kg | HH370 | 10 | 30 | Fixed | Fixed | Fixed | −30 to +10 | 6 | 2 | 331 |
| Comp. Ex. 2 | JIS 60 kg | HH340 | 7 | 25 | | | | −30 to +10 | 4 | 1 | 311 |
| Comp. Ex. 3 | JIS 50 kg N | HH370 | 5 | 20 | | | | −30 to +10 | 6 | 2 | 331 |
| Comp. Ex. 4 | JIS 50 kg N | HH340 | 3 | 15 | | | | −30 to +10 | 4 | 1 | 311 |

| | Hardness [Hv] | | | | | | | | | |
|---|---|---|---|---|---|---|---|---|---|---|
| | Reference point | | Surface | | | | Whole | | | |
| | Minimum | Maximum | Lower limit | Upper limit | Minimum | Maximum | Upper limit | Hardness | Structure | Remarks |
| Ex. 1 | 360 | 375 | 349 | 410 | 372 | 387 | 410 | ○ | ○ | |
| Ex. 2 | 332 | 339 | 338 | 396 | 340 | 346 | 410 | ○ | ○ | |
| Ex. 3 | 360 | 375 | 349 | 410 | 372 | 387 | 410 | ○ | ○ | |
| Ex. 4 | 332 | 339 | 338 | 396 | 340 | 346 | 410 | ○ | ○ | |
| Comp. Ex. 1 | 320 | 390 | 349 | 410 | 340 | 420 | 410 | X | X | Reference point lower limit deviation, Whole upper limit deviation, Bainite occurrence |
| Comp. Ex. 2 | 320 | 370 | 338 | 396 | 330 | 400 | 410 | X | ○ | Surface upper and lower limits deviation occurrence |
| Comp. Ex. 3 | 320 | 390 | 349 | 410 | 340 | 420 | 410 | X | X | Reference point lower limit deviation, Whole upper limit deviation, Bainite occurrence |
| Comp. Ex. 4 | 320 | 370 | 338 | 396 | 330 | 400 | 410 | X | ○ | Surface upper and lower limits deviation occurrence |

As can be seen from Table 1, in Examples 1 to 4, the hardness variation of the rail 1 was reduced, an abnormal microstructure such as the bainitic structure or the martensite structure did not occur in all the examples, and the uniform rail 1 could be stably manufactured.

On the other hand, in the Comparative Examples, the thermal treatment was appropriately performed under the condition that the inlet-side temperature of the cooling facility 7 was close to the target temperature, and the target hardness and microstructure were obtained. However, when deviating from the target temperature, variation in hardness was large, and in some instances, formation of an abnormal microstructure was observed.

The entire contents of Japanese Patent Application No. 2020-100895 (filed on Jun. 10, 2020), from which this application claims priority, form part of the present disclosure by reference. The description has been made with reference to a limited number of examples. However, the scope of rights is not limited thereto, and modifications of each example based on the above disclosure will be obvious to those skilled in the art.

The invention claimed is:

1. A hardness prediction method for a heat hardened rail, of predicting, after a thermal treatment process in which a rail having a temperature equal to or higher than an austenite region temperature is forcibly cooled in a cooling facility, hardness of the rail, the method comprising:

acquiring, by using an internal hardness computing model that is a physical model of performing computing by using a cooling condition data set having at least a surface temperature of the rail before a start of cooling and operating conditions of the cooling facility for the forced cooling as input data and using hardness inside at least a rail head portion of the rail after the forced cooling as output data, a plurality of sets of data for learning composed of the cooling condition data set and the hardness output data;

generating in advance a hardness prediction model using the cooling condition data set as at least input data and using information on hardness inside the rail after the forced cooling as output data, by machine learning using the acquired plurality of sets of data for learning;

predicting the hardness of the rail after the thermal treatment process, based on information on the hardness inside the rail with respect to a set of cooling condition data sets set as cooling conditions of the thermal treatment process for achieving target hardness, obtained by using the hardness prediction model; and controlling, using a control device, cooling conditions of the rail head based on the predicted hardness.

2. The hardness prediction method according to claim 1, wherein output data computed using the internal hardness computing model is a hardness distribution in at least a region from a rail surface to a depth set in advance.

3. The hardness prediction method according to claim 1, wherein the internal hardness computing model is configured to calculate a heat transfer coefficient of a rail surface during thermal treatment using the cooling facility, achieving target hardness having at least a surface temperature of the rail before a start of cooling in the cooling facility and operating conditions of the cooling facility for the forced cooling, the method comprising:

acquiring, by using an internal hardness computing model that is a physical model for performing computing by using the cooling condition data set as input data and using hardness inside at least a rail head portion of the rail after the forced cooling as output data, a plurality of sets of data for learning composed of the cooling condition data set and the hardness output data;

generating in advance a hardness prediction model using the cooling condition data set as at least input data and using information on hardness inside the rail after the forced cooling as output data, by machine learning using the acquired plurality of sets of data for learning; and controlling, using a control device, cooling conditions of the rail head based on the predicted hardness.

4. A thermal treatment method for a heat hardened rail having a thermal treatment process in which a rail having a temperature equal to or higher than an austenite region temperature is forcibly cooled in a cooling facility, the method comprising:

measuring a surface temperature of the rail before a start of cooling;

predicting hardness inside the rail by using the measured surface temperature of the rail by the hardness prediction method for the heat hardened rail according to claim 1, before starting cooling of the rail in the cooling facility; and resetting, when the predicted hardness inside the rail is out of a target hardness range, operating conditions of the cooling facility such that the predicted hardness inside the rail falls within the target hardness range.

5. The thermal treatment method according to claim 4, wherein the operating conditions of the cooling facility to be reset include at least one operating condition among an injection pressure, an injection distance, an injection position, and an injection time of a cooling medium injected toward the rail in the cooling facility.

6. The thermal treatment method according to claim 4, wherein the cooling facility has a plurality of cooling zones disposed along a longitudinal direction of the rail to be cooled, and the resetting of the operating conditions of the cooling facility is executed individually for each of the cooling zones.

7. A method of generating a hardness prediction model for obtaining, after a rail having a temperature equal to or higher than an austenite region temperature is forcibly cooled in a cooling facility, hardness of the rail from a cooling condition data set for.

8. The method according to claim 7, wherein output data computed using the internal hardness computing model is a hardness distribution in at least a region from a rail surface to a depth set in advance.

9. The method according to claim 7, wherein the hardness prediction model is a neural network model, a random forest, or a model learned by SVM regression.

10. A method of manufacturing a heat hardened rail comprising:

the thermal treatment method for the heat hardened rail according to claim 4.

11. A hardness prediction device for a heat hardened rail, which predicts, after a thermal treatment process in which a rail having a temperature equal to or higher than an austenite region temperature is forcibly cooled in a cooling facility, hardness of the rail, the device comprising:

a database configured to store a plurality of sets of data for learning computed using an internal hardness computing model that is a physical model for performing computing by using a cooling condition data set having at least a surface temperature of the rail before a start of cooling and operating conditions of the cooling facility for the forced cooling as input data and using hardness inside at least a rail head portion of the rail after the forced cooling as output data, and composed of the cooling condition data set and the hardness output data; and a thermometer configured to measure the surface temperature of the rail before the start of cooling; and a control device configured to control the cooling conditions of the rail head based on the predicted hardness;

wherein the hardness prediction device is configured to generate a hardness prediction model using the cooling condition data set as at least input data and using information on hardness inside the rail after the forced cooling as output data, by machine learning using the plurality of sets of data for learning; and wherein the hardness prediction device is configured to predict the hardness of the rail after the thermal treatment process, based on information on the hardness inside the rail with respect to a set of cooling condition data sets set as cooling conditions of the thermal treatment process for achieving target hardness, by using a measured value measured by the thermometer and the hardness prediction model.

12. The hardness prediction device according to claim 11, wherein output data computed using the internal hardness computing model is a hardness distribution in at least a region from a rail surface to a depth set in advance.

13. The hardness prediction device according to claim 11, wherein the internal hardness computing model is configured to calculate a heat transfer coefficient of the rail surface during thermal treatment using the cooling facility, calculate a temperature history inside the rail by the thermal treatment by using the heat transfer coefficient calculated by the heat transfer coefficient calculation unit as a boundary condition, predict a microstructure inside the rail considering phase transformation, from the temperature distribution inside the rail based on the temperature history calculation calculated by the heat conduction calculation unit, and calculate the hardness inside the rail from a microstructure distribution inside the rail based on the microstructure prediction inside the rail calculated by the microstructure calculation unit.

14. A thermal treatment device for a heat hardened rail having a thermal treatment process in which a rail having a temperature equal to or higher than an austenite region temperature is forcibly cooled in a cooling facility, the device configured to:

predict hardness inside the rail by the hardness prediction device for the heat hardened rail according to claim 11, before a start of cooling of the rail in the cooling facility; and reset, when the hardness inside the rail predicted by the hardness prediction unit is out of a target hardness range, operating conditions of the cooling facility such that the predicted hardness inside the rail falls within the target hardness range.

15. The thermal treatment device according to claim 14, wherein the operating conditions of the cooling facility to be reset include at least one operating condition among an injection pressure, an injection distance, an injection position, and an injection time of a cooling medium injected toward the rail in the cooling facility.

16. A manufacturing facility for a heat hardened rail comprising:

the thermal treatment device for the heat hardened rail according to claim 14.

17. The hardness prediction method according to claim 2, wherein the internal hardness computing model is configured to calculate a heat transfer coefficient of a rail surface during thermal treatment using the cooling facility, calculate a temperature history inside the rail by the thermal treatment by using the heating transfer coefficient calculated by the heat transfer coefficient calculation unit as a boundary condition, predict a microstructure inside the rail considering phase transformation, from the temperature distribution inside the rail based on the temperature history calculation calculated by the heat conduction calculation unit, and calculate the hardness inside the rail from a microstructure distribution inside the rail based on the microstructure prediction inside the rail calculated by the microstructure calculation unit.

18. A thermal treatment method for a heat hardened rail having a thermal treatment process in which a rail having a temperature equal to or higher than an austenite region temperature is forcibly cooled in a cooling facility, the method comprising:

measuring a surface temperature of the rail before a start of cooling;

predicting hardness inside the rail by using the measured surface temperature of the rail by the hardness prediction method for the heat hardened rail according to claim 2, before the start of cooling of the rail in the cooling facility; and resetting, when the predicted hardness inside the rail is out of a target hardness range, operating conditions of the cooling facility such that the predicted hardness inside the rail falls within the target hardness range.

19. A thermal treatment method for a heat hardened rail having a thermal treatment process in which a rail having a temperature equal to or higher than an austenite region temperature is forcibly cooled in a cooling facility, the method comprising:

measuring a surface temperature of the rail before a start of cooling;

predicting hardness inside the rail by using the measured surface, temperature of the rail by the hardness prediction method for the heat hardened rail according to claim 3, before the start of cooling of the rail in the cooling facility; and resetting, when the predicted hardness inside the rail is out of a target hardness range, operating conditions of the cooling facility such that the predicted hardness inside the rail falls within the target hardness range.

20. The thermal treatment method according to claim 5, wherein the cooling facility has a plurality of cooling zones disposed along a longitudinal direction of the rail to be cooled, and the resetting of the operating conditions of the cooling facility is executed individually for each of the cooling zones, calculate a temperature history inside the rail by the thermal treatment by using the heat transfer coefficient calculated by the heat transfer coefficient calculation unit as a boundary condition, predict a microstructure inside the rail considering phase transformation, from the temperature distribution inside the rail based on the temperature history calculation calculated by the heat conduction calculation unit, and calculate the hardness inside the rail from a microstructure distribution inside the rail based on the microstructure prediction inside the rail calculated by the microstructure calculation unit.

* * * * *